US009001939B2

(12) United States Patent
Akutagawa et al.

(10) Patent No.: US 9,001,939 B2
(45) Date of Patent: Apr. 7, 2015

(54) TRANSMITTER, RECEIVER, COMMUNICATION SYSTEM, AND COMMUNICATION METHOD

(75) Inventors: Hiroyuki Akutagawa, Kodaira (JP); Takehiko Kobayashi, Kodaira (JP)

(73) Assignee: Hitachi Kokusai Electric Inc., Chiyoda-ku, Tokyo (JP)

( * ) Notice: Subject to any disclaimer, the term of this patent is extended or adjusted under 35 U.S.C. 154(b) by 0 days.

(21) Appl. No.: 13/996,430

(22) PCT Filed: Dec. 20, 2011

(86) PCT No.: PCT/JP2011/079552
§ 371 (c)(1),
(2), (4) Date: Jul. 26, 2013

(87) PCT Pub. No.: WO2012/086654
PCT Pub. Date: Jun. 28, 2012

(65) Prior Publication Data
US 2013/0294552 A1    Nov. 7, 2013

(30) Foreign Application Priority Data

Dec. 21, 2010  (JP) .................................. 2010-284602

(51) Int. Cl.
*H03D 1/00* (2006.01)
*H04L 1/06* (2006.01)
*H04L 7/04* (2006.01)
*H04B 7/06* (2006.01)

(52) U.S. Cl.
CPC ................ *H04L 1/0643* (2013.01); *H04L 7/04* (2013.01); *H04L 1/0631* (2013.01); *H04B 7/0669* (2013.01)

(58) Field of Classification Search
USPC .................................. 375/299, 308, 324, 340
See application file for complete search history.

(56) References Cited

U.S. PATENT DOCUMENTS

| 6,686,855 | B2 * | 2/2004 | Hayami et al. .................. 341/59 |
| 2006/0056539 | A1 * | 3/2006 | Nam et al. ..................... 375/299 |
| 2006/0182199 | A1 * | 8/2006 | Hong et al. .................... 375/299 |
| 2008/0063034 | A1 | 3/2008 | Yang et al. |
| 2012/0219093 | A1 * | 8/2012 | Jia et al. ......................... 375/308 |
| 2014/0153550 | A1 * | 6/2014 | Qi et al. ......................... 370/336 |

FOREIGN PATENT DOCUMENTS

| JP | 2009-303086 A | 12/2009 |
| JP | 2010-504005 A | 2/2010 |
| JP | 2010-118987 A | 5/2010 |

\* cited by examiner

*Primary Examiner* — Eva Puente
(74) *Attorney, Agent, or Firm* — Taft Stettinius & Hollister LLP

(57) ABSTRACT

Provided is a transmitter for transmitting signals by means of the STBC method or the DSTBC method, wherein communication is carried out effectively. The transmitter for transmitting signals by means of the STBC method or the DSTBC method has the following configuration. A frame in which synchronization words are arranged at specified positions is used. An encoding means in the transmitter encodes the entire frame to be transmitted including the synchronization words, by means of the STBC method or the DSTBC method. It is also possible to implement a communication system and a communication method for communicating signals by means of the STBC method or the DSTBC method.

3 Claims, 27 Drawing Sheets

Proposed Method

Comparative Method

Frame of Input Bit Data    (Same for Proposed Method and Comparative Method)

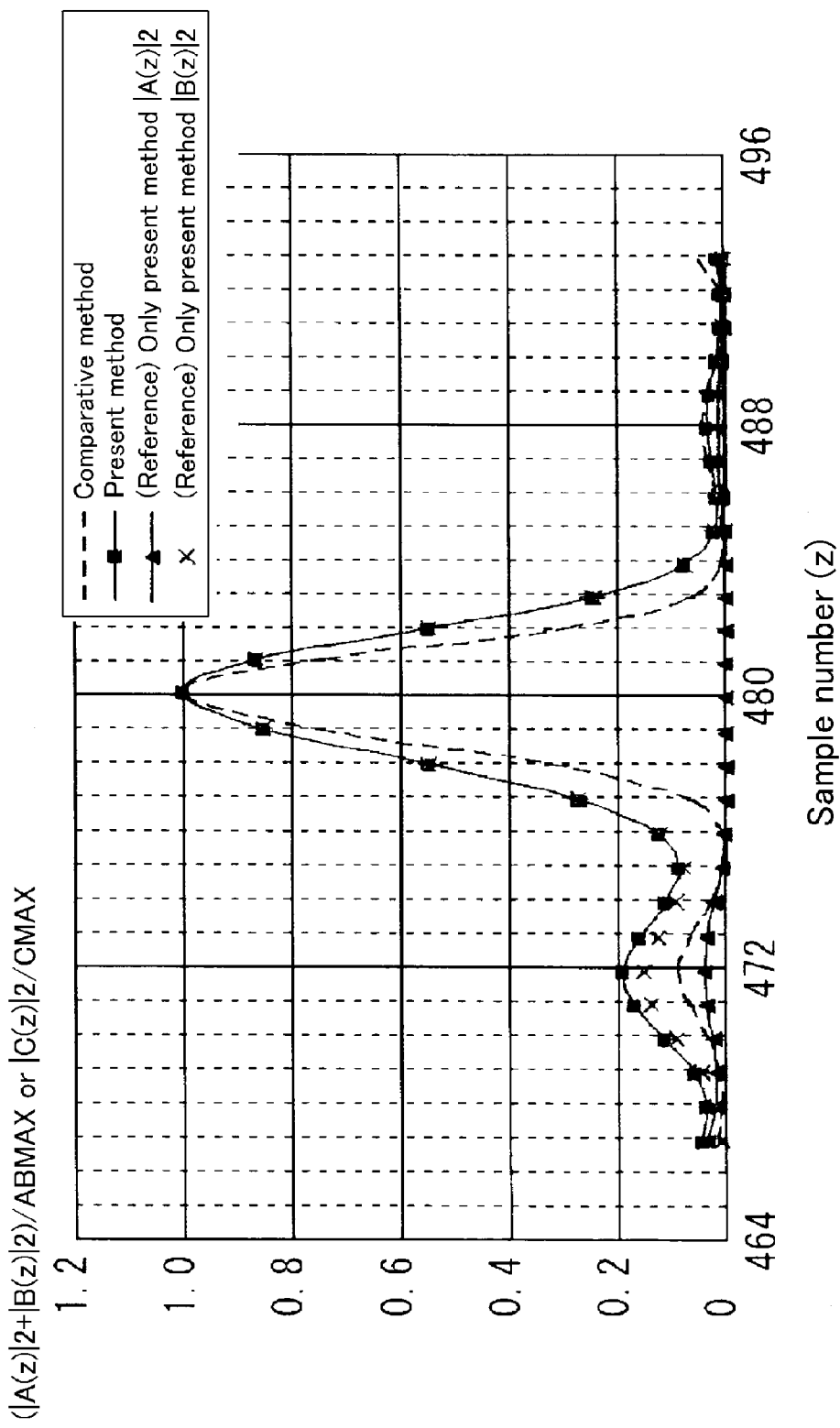

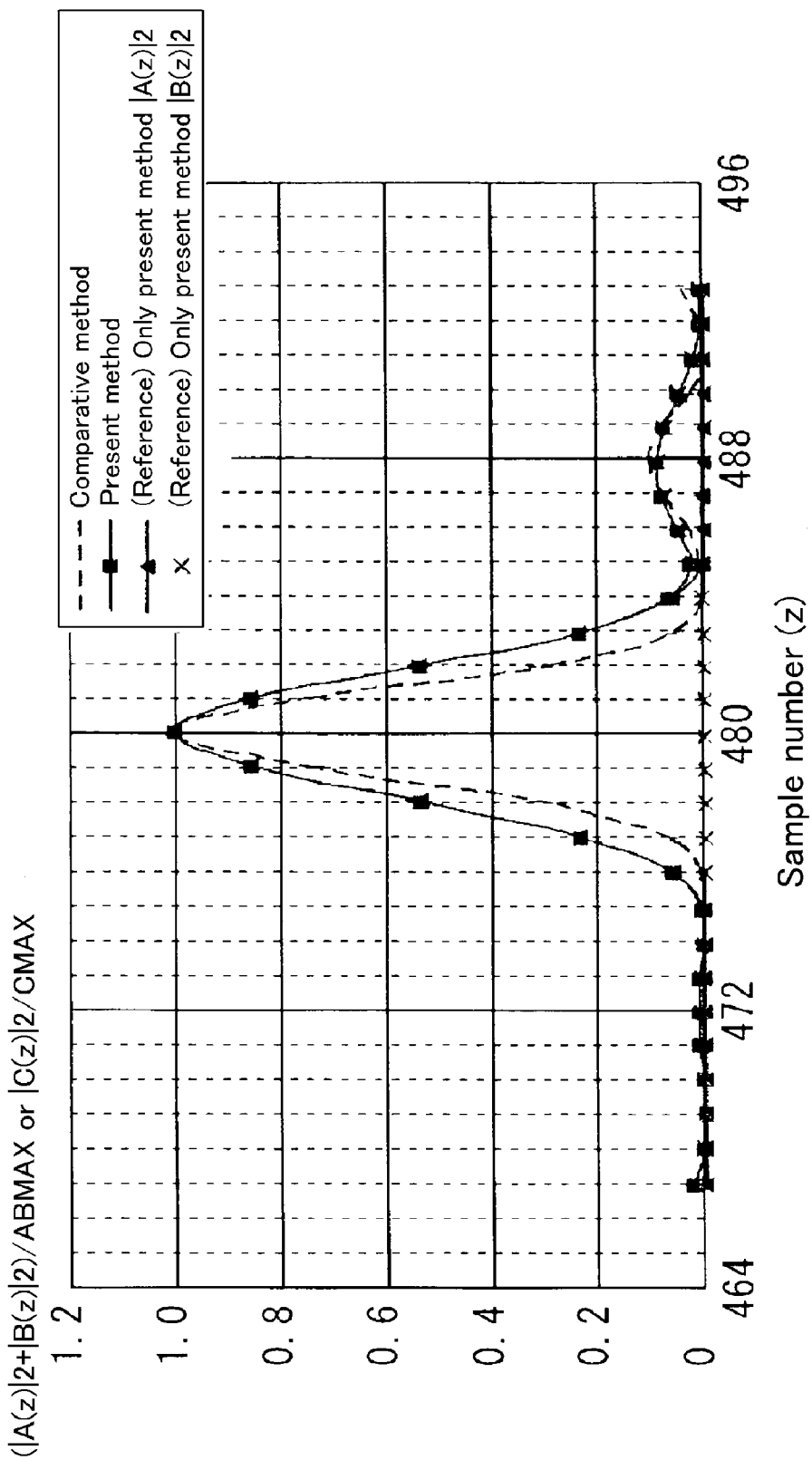

Example of Output of Initial Value Updating Unit

| Output of differential encoding unit in front stage directly before synchronous words (input of initial value updating unit) | | | Initial values $S_{-2}$ and $S_{-1}$ of differential encoding unit in rear stage (output of initial value updating unit) | | |
|---|---|---|---|---|---|
| State No. | $S'_{58}$ | $S'_{59}$ | State No. | $S_{-2}$ | $S_{-1}$ |
| 1 | [1] | [13] | 1 | [1] | [13] |
| 2 | [1] | [18] | 15 | [11] | [6] |
| 3 | [2] | [15] | 8 | [4] | [19] |
| 4 | [2] | [20] | 12 | [8] | [10] |
| 5 | [3] | [14] | 13 | [9] | [8] |
| 6 | [3] | [17] | 6 | [3] | [17] |
| 7 | [4] | [16] | 10 | [6] | [12] |
| 8 | [4] | [19] | 3 | [2] | [15] |
| 9 | [5] | [11] | 21 | [17] | [4] |
| 10 | [6] | [12] | 7 | [4] | [16] |
| 11 | [7] | [9] | 17 | [13] | [2] |
| 12 | [8] | [10] | 4 | [2] | [20] |
| 13 | [9] | [8] | 5 | [3] | [14] |
| 14 | [10] | [5] | 23 | [19] | [1] |
| 15 | [11] | [6] | 2 | [1] | [18] |
| 16 | [12] | [7] | 19 | [15] | [3] |
| 17 | [13] | [2] | 11 | [7] | [9] |
| 18 | [14] | [4] | 22 | [18] | [2] |
| 19 | [15] | [3] | 16 | [12] | [7] |
| 20 | [16] | [1] | 24 | [20] | [3] |
| 21 | [17] | [4] | 9 | [5] | [11] |
| 22 | [18] | [2] | 18 | [14] | [4] |
| 23 | [19] | [1] | 14 | [10] | [5] |
| 24 | [20] | [3] | 20 | [16] | [1] |

FIG. 10

Simulation Results(Case1-1)

Initial value:(formula 12)
Initial value:set using conversion table

| | m | Input pattern 1 | $S'_{2m}$ | $S'_{2m+1}$ | State No. | $S_{2m}$ | $S_{2m+1}$ | State No. | |
|---|---|---|---|---|---|---|---|---|---|
| | | | $S'_{-2}$ | $S'_{-1}$ | 1 | $S_{-2}$ | $S_{-1}$ | 12 | |
| | 0 | 0001 | $S'_0$ | $S'_1$ | 2 | $S_0$ | $S_1$ | 8 | |
| | 1 | 0111 | $S'_2$ | $S'_3$ | 18 | $S_2$ | $S_3$ | 13 | |
| | 2 | 1001 | $S'_4$ | $S'_5$ | 19 | $S_4$ | $S_5$ | 18 | |
| | 3 | 0111 | $S'_6$ | $S'_7$ | 24 | $S_6$ | $S_7$ | 16 | |
| | 4 | 0001 | $S'_8$ | $S'_9$ | 21 | $S_8$ | $S_9$ | 20 | |
| | 5 | 0101 | $S'_{10}$ | $S'_{11}$ | 20 | $S_{10}$ | $S_{11}$ | 14 | |
| | 6 | 0100 | $S'_{12}$ | $S'_{13}$ | 21 | $S_{12}$ | $S_{13}$ | 20 | |
| | 7 | 1100 | $S'_{14}$ | $S'_{15}$ | 15 | $S_{14}$ | $S_{15}$ | 19 | |
| | 8 | 1110 | $S'_{16}$ | $S'_{17}$ | 24 | $S_{16}$ | $S_{17}$ | 16 | |
| | 9 | 1001 | $S'_{18}$ | $S'_{19}$ | 15 | $S_{18}$ | $S_{19}$ | 19 | |
| | 10 | 1010 | $S'_{20}$ | $S'_{21}$ | 20 | $S_{20}$ | $S_{21}$ | 14 | |
| | 11 | 0110 | $S'_{22}$ | $S'_{23}$ | 13 | $S_{22}$ | $S_{23}$ | 23 | |
| | 12 | 0111 | $S'_{24}$ | $S'_{25}$ | 18 | $S_{24}$ | $S_{25}$ | 13 | |
| R,P, TCH random bits | 13 | 0010 | $S'_{26}$ | $S'_{27}$ | 2 | $S_{26}$ | $S_{27}$ | 8 | |
| | 14 | 0010 | $S'_{28}$ | $S'_{29}$ | 20 | $S_{28}$ | $S_{29}$ | 14 | |
| | 15 | 0010 | $S'_{30}$ | $S'_{31}$ | 13 | $S_{30}$ | $S_{31}$ | 23 | |
| | 16 | 1111 | $S'_{32}$ | $S'_{33}$ | 4 | $S_{32}$ | $S_{33}$ | 1 | |
| | 17 | 1011 | $S'_{34}$ | $S'_{35}$ | 6 | $S_{34}$ | $S_{35}$ | 10 | |
| | 18 | 0101 | $S'_{36}$ | $S'_{37}$ | 2 | $S_{36}$ | $S_{37}$ | 8 | |
| | 19 | 1011 | $S'_{38}$ | $S'_{39}$ | 12 | $S_{38}$ | $S_{39}$ | 7 | |
| | 20 | 0001 | $S'_{40}$ | $S'_{41}$ | 18 | $S_{40}$ | $S_{41}$ | 13 | |
| | 21 | 1101 | $S'_{42}$ | $S'_{43}$ | 15 | $S_{42}$ | $S_{43}$ | 19 | |
| | 22 | 0010 | $S'_{44}$ | $S'_{45}$ | 2 | $S_{44}$ | $S_{45}$ | 8 | |
| | 23 | 0110 | $S'_{46}$ | $S'_{47}$ | 11 | $S_{46}$ | $S_{47}$ | 5 | |
| | 24 | 0000 | $S'_{48}$ | $S'_{49}$ | 22 | $S_{48}$ | $S_{49}$ | 15 | |
| | 25 | 1011 | $S'_{50}$ | $S'_{51}$ | 19 | $S_{50}$ | $S_{51}$ | 18 | |
| | 26 | 1000 | $S'_{52}$ | $S'_{53}$ | 6 | $S_{52}$ | $S_{53}$ | 10 | State No. becomes 1 directly before SW |
| | 27 | 1010 | $S'_{54}$ | $S'_{55}$ | 23 | $S_{54}$ | $S_{55}$ | 22 | |
| | 28 | 1101 | $S'_{56}$ | $S'_{57}$ | 14 | $S_{56}$ | $S_{57}$ | 17 | |
| | 29 | 0010 | $S'_{58}$ | $S'_{59}$ | 4 | $S_{58}$ | $S_{59}$ | 1 | |
| SW fixed bits | 30 | 1000 | $S'_{60}$ | $S'_{61}$ | 8 | $S_{60}$ | $S_{61}$ | 11 | Mapping pattern of SW is fixed |
| | 31 | 0001 | $S'_{62}$ | $S'_{63}$ | 13 | $S_{62}$ | $S_{63}$ | 23 | |
| | 32 | 1101 | $S'_{64}$ | $S'_{65}$ | 7 | $S_{64}$ | $S_{65}$ | 6 | |
| | 33 | 0111 | $S'_{66}$ | $S'_{67}$ | 8 | $S_{66}$ | $S_{67}$ | 11 | |
| | 34 | 0101 | $S'_{68}$ | $S'_{69}$ | 17 | $S_{68}$ | $S_{69}$ | 24 | |
| | | ... | | | | | | | |

FIG. 11

Simulation Results(Case1-2)

| | m | Input pattern 2 | $S'_{2m}$ | $S'_{2m+1}$ | State No. | | $S_{2m}$ | $S_{2m+1}$ | State No. | |
|---|---|---|---|---|---|---|---|---|---|---|
| | | | $S'_{-2}$ | $S'_{-1}$ | 1 | ← Initial value:(formula 12) | $S_{-2}$ | $S_{-1}$ | 20 | ← Initial value:set using conversion table |
| | 0 | 0111 | $S'_0$ | $S'_1$ | 9 | | $S_0$ | $S_1$ | 12 | |
| | 1 | 0100 | $S'_2$ | $S'_3$ | 4 | | $S_2$ | $S_3$ | 19 | |
| | 2 | 1000 | $S'_4$ | $S'_5$ | 8 | | $S_4$ | $S_5$ | 18 | |
| | 3 | 0010 | $S'_6$ | $S'_7$ | 11 | | $S_6$ | $S_7$ | 10 | |
| | 4 | 1010 | $S'_8$ | $S'_9$ | 20 | | $S_8$ | $S_9$ | 6 | |
| | 5 | 1110 | $S'_{10}$ | $S'_{11}$ | 9 | | $S_{10}$ | $S_{11}$ | 12 | |
| | 6 | 1010 | $S'_{12}$ | $S'_{13}$ | 24 | | $S_{12}$ | $S_{13}$ | 1 | |
| | 7 | 0100 | $S'_{14}$ | $S'_{15}$ | 14 | | $S_{14}$ | $S_{15}$ | 15 | |
| | 8 | 1010 | $S'_{16}$ | $S'_{17}$ | 18 | | $S_{16}$ | $S_{17}$ | 3 | |
| | 9 | 1000 | $S'_{18}$ | $S'_{19}$ | 13 | | $S_{18}$ | $S_{19}$ | 14 | |
| | 10 | 0110 | $S'_{20}$ | $S'_{21}$ | 20 | | $S_{20}$ | $S_{21}$ | 6 | |
| | 11 | 1110 | $S'_{22}$ | $S'_{23}$ | 9 | | $S_{22}$ | $S_{23}$ | 12 | |
| | 12 | 1011 | $S'_{24}$ | $S'_{25}$ | 7 | | $S_{24}$ | $S_{25}$ | 23 | |
| R,P, | 13 | 1101 | $S'_{26}$ | $S'_{27}$ | 20 | | $S_{26}$ | $S_{27}$ | 6 | |
| TCH | 14 | 1000 | $S'_{28}$ | $S'_{29}$ | 10 | | $S_{28}$ | $S_{29}$ | 9 | |
| random | 15 | 1001 | $S'_{30}$ | $S'_{31}$ | 18 | | $S_{30}$ | $S_{31}$ | 3 | |
| bits | 16 | 0010 | $S'_{32}$ | $S'_{33}$ | 10 | | $S_{32}$ | $S_{33}$ | 9 | |
| | 17 | 0100 | $S'_{34}$ | $S'_{35}$ | 23 | | $S_{34}$ | $S_{35}$ | 4 | |
| | 18 | 0110 | $S'_{36}$ | $S'_{37}$ | 14 | | $S_{36}$ | $S_{37}$ | 15 | |
| | 19 | 0110 | $S'_{38}$ | $S'_{39}$ | 6 | | $S_{38}$ | $S_{39}$ | 24 | |
| | 20 | 1100 | $S'_{40}$ | $S'_{41}$ | 17 | | $S_{40}$ | $S_{41}$ | 5 | |
| | 21 | 0101 | $S'_{42}$ | $S'_{43}$ | 15 | | $S_{42}$ | $S_{43}$ | 16 | |
| | 22 | 1111 | $S'_{44}$ | $S'_{45}$ | 1 | | $S_{44}$ | $S_{45}$ | 20 | |
| | 23 | 0011 | $S'_{46}$ | $S'_{47}$ | 17 | | $S_{46}$ | $S_{47}$ | 5 | |
| | 24 | 0000 | $S'_{48}$ | $S'_{49}$ | 14 | | $S_{48}$ | $S_{49}$ | 15 | |
| | 25 | 0000 | $S'_{50}$ | $S'_{51}$ | 20 | | $S_{50}$ | $S_{51}$ | 6 | |
| | 26 | 1001 | $S'_{52}$ | $S'_{53}$ | 4 | | $S_{52}$ | $S_{53}$ | 19 | |
| | 27 | 1000 | $S'_{54}$ | $S'_{55}$ | 8 | | $S_{54}$ | $S_{55}$ | 18 | ← State No. becomes 1 directly before SW |
| | 28 | 0001 | $S'_{56}$ | $S'_{57}$ | 13 | | $S_{56}$ | $S_{57}$ | 14 | |
| | 29 | 1001 | $S'_{58}$ | $S'_{59}$ | 24 | | $S_{58}$ | $S_{59}$ | 1 | |
| | 30 | 1000 | $S'_{60}$ | $S'_{61}$ | 12 | | $S_{60}$ | $S_{61}$ | 11 | |
| SW | 31 | 0001 | $S'_{62}$ | $S'_{63}$ | 7 | | $S_{62}$ | $S_{63}$ | 23 | Mapping pattern of SW is fixed |
| fixed | 32 | 1101 | $S'_{64}$ | $S'_{65}$ | 20 | | $S_{64}$ | $S_{65}$ | 6 | |
| bits | 33 | 0111 | $S'_{66}$ | $S'_{67}$ | 12 | | $S_{66}$ | $S_{67}$ | 11 | |
| | 34 | 0101 | $S'_{68}$ | $S'_{69}$ | 6 | | $S_{68}$ | $S_{69}$ | 24 | |
| | ... | | | | | | | | | |

FIG. 12

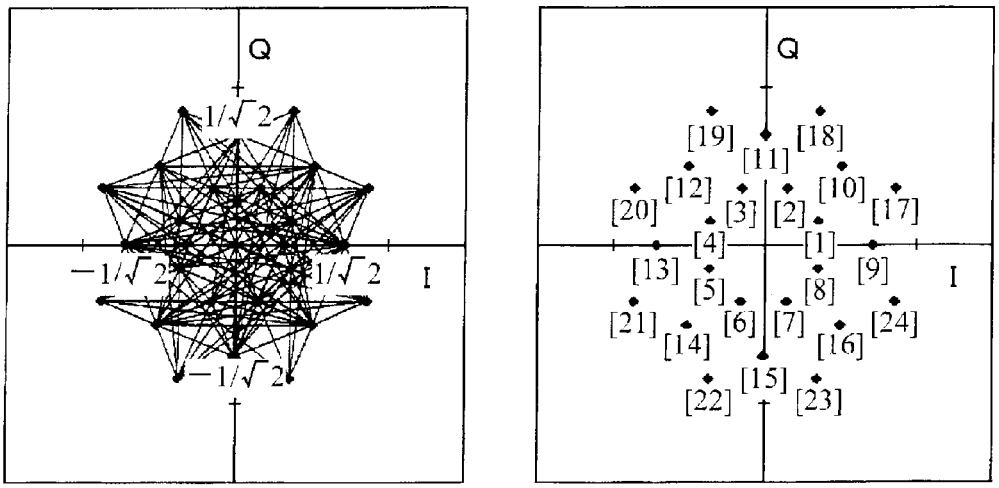

Coordinates of 24 Points

$S = \sin(\pi/8)\{\cos(\pi/8) + j \cdot \sin(\pi/8)\}$ $S = \sin(\pi/8)\{\cos(3\pi/8) + j \cdot \sin(3\pi/8)\}$ $S = \sin(\pi/8)\{\cos(5\pi/8) + j \cdot \sin(5\pi/8)\}$ $S = \sin(\pi/8)\{\cos(7\pi/8) + j \cdot \sin(7\pi/8)\}$ $S = \sin(\pi/8)\{\cos(9\pi/8) + j \cdot \sin(9\pi/8)\}$ $S = \sin(\pi/8)\{\cos(11\pi/8) + j \cdot \sin(11\pi/8)\}$ $S = \sin(\pi/8)\{\cos(13\pi/8) + j \cdot \sin(13\pi/8)\}$ $S = \sin(\pi/8)\{\cos(15\pi/8) + j \cdot \sin(15\pi/8)\}$ $S = \sin(\pi/4)\{\cos(0) + j \cdot \sin(0)\}$ $S = \sin(\pi/4)\{\cos(\pi/4) + j \cdot \sin(\pi/4)\}$ $S = \sin(\pi/4)\{\cos(\pi/2) + j \cdot \sin(\pi/2)\}$ $S = \sin(\pi/4)\{\cos(3\pi/4) + j \cdot \sin(3\pi/4)\}$ $S = \sin(\pi/4)\{\cos(\pi) + j \cdot \sin(\pi)\}$ $S = \sin(\pi/4)\{\cos(5\pi/4) - j \cdot \sin(5\pi/4)\}$ $S = \sin(\pi/4)\{\cos(3\pi/2) + j \cdot \sin(3\pi/2)\}$ $S = \sin(\pi/4)\{\cos(7\pi/4) + j \cdot \sin(7\pi/4)\}$ $S = \sin(3\pi/8)\{\cos(\pi/8) + j \cdot \sin(\pi/8)\}$ $S = \sin(3\pi/8)\{\cos(3\pi/8) + j \cdot \sin(3\pi/8)\}$ $S = \sin(3\pi/8)\{\cos(5\pi/8) + j \cdot \sin(5\pi/8)\}$ $S = \sin(3\pi/8)\{\cos(7\pi/8) + j \cdot \sin(7\pi/8)\}$ $S = \sin(3\pi/4)\{\cos(9\pi/8) + j \cdot \sin(9\pi/8)\}$ $S = \sin(3\pi/4)\{\cos(11\pi/8) + j \cdot \sin(11\pi/8)\}$ $S = \sin(3\pi/4)\{\cos(13\pi/8) + j \cdot \sin(13\pi/8)\}$ $S = \sin(3\pi/4)\{\cos(15\pi/8) + j \cdot \sin(15\pi/8)\}$ j is the imaginary unit

FIG. 13

| State No. | $S_{2m}$ | $S_{2m+1}$ |
|---|---|---|
| 1 | [1] | [17] |
| 2 | [2] | [22] |
| 3 | [3] | [19] |
| 4 | [4] | [24] |
| 5 | [5] | [21] |
| 6 | [6] | [18] |
| 7 | [7] | [23] |
| 8 | [8] | [20] |
| 9 | [9] | [11] |
| 10 | [10] | [16] |
| 11 | [11] | [13] |
| 12 | [12] | [10] |
| 13 | [13] | [15] |
| 14 | [14] | [12] |
| 15 | [15] | [9] |
| 16 | [16] | [14] |
| 17 | [17] | [5] |
| 18 | [18] | [2] |
| 19 | [19] | [7] |
| 20 | [20] | [4] |
| 21 | [21] | [1] |
| 22 | [22] | [6] |
| 23 | [23] | [3] |
| 24 | [24] | [8] |

[1] to [24] indicate the numbers of the mapping points

Example of Output of Initial Value Updating Unit

| Output of differential encoding unit in front stage directly before synchronous words (input of initial value updating unit) | | | Initial values $S_{-2}$ and $S_{-1}$ of differential encoding unit in rear stage (output of initial value updating unit) | | |
|---|---|---|---|---|---|
| State No. | $S'_{58}$ | $S'_{59}$ | State No. | $S_{-2}$ | $S_{-1}$ |
| 1 | [1] | [17] | 1 | [1] | [17] |
| 2 | [2] | [22] | 14 | [14] | [12] |
| 3 | [3] | [19] | 7 | [7] | [23] |
| 4 | [4] | [24] | 9 | [9] | [11] |
| 5 | [5] | [21] | 5 | [5] | [21] |
| 6 | [6] | [18] | 10 | [10] | [16] |
| 7 | [7] | [23] | 3 | [3] | [19] |
| 8 | [8] | [20] | 13 | [13] | [15] |
| 9 | [9] | [11] | 4 | [4] | [24] |
| 10 | [10] | [16] | 6 | [6] | [18] |
| 11 | [11] | [13] | 22 | [22] | [6] |
| 12 | [12] | [10] | 24 | [24] | [8] |
| 13 | [13] | [15] | 8 | [8] | [20] |
| 14 | [14] | [12] | 2 | [2] | [22] |
| 15 | [15] | [9] | 18 | [18] | [2] |
| 16 | [16] | [14] | 20 | [20] | [4] |
| 17 | [17] | [5] | 21 | [21] | [1] |
| 18 | [18] | [2] | 15 | [15] | [9] |
| 19 | [19] | [7] | 23 | [23] | [3] |
| 20 | [20] | [4] | 16 | [16] | [14] |
| 21 | [21] | [1] | 17 | [17] | [5] |
| 22 | [22] | [6] | 11 | [11] | [13] |
| 23 | [23] | [3] | 19 | [19] | [7] |
| 24 | [24] | [8] | 12 | [12] | [10] |

FIG. 15

Simulation Results(Case2-1)

| | | Initial value:(formula 15) | | | Initial value:set using conversion table | | | |
|---|---|---|---|---|---|---|---|---|
| m | Input pattern 1 | $S'_{2m}$ | $S'_{2m+1}$ | State No. | $S_{2m}$ | $S_{2m+1}$ | State No. | |
| | | $S'_{-2}$ | $S'_{-1}$ | 1 | $S_{-2}$ | $S_{-1}$ | 20 | |
| 0 | 0001 | $S'_0$ | $S'_1$ | 6 | $S_0$ | $S_1$ | 13 | |
| 1 | 0111 | $S'_2$ | $S'_3$ | 16 | $S_2$ | $S_3$ | 1 | |
| 2 | 1001 | $S'_4$ | $S'_5$ | 8 | $S_4$ | $S_5$ | 15 | |
| 3 | 0111 | $S'_6$ | $S'_7$ | 13 | $S_6$ | $S_7$ | 17 | |
| 4 | 0001 | $S'_8$ | $S'_9$ | 7 | $S_8$ | $S_9$ | 18 | |
| 5 | 0101 | $S'_{10}$ | $S'_{11}$ | 9 | $S_{10}$ | $S_{11}$ | 21 | |
| 6 | 0100 | $S'_{12}$ | $S'_{13}$ | 19 | $S_{12}$ | $S_{13}$ | 8 | |
| 7 | 1100 | $S'_{14}$ | $S'_{15}$ | 16 | $S_{14}$ | $S_{15}$ | 1 | |
| 8 | 1110 | $S'_{16}$ | $S'_{17}$ | 21 | $S_{16}$ | $S_{17}$ | 2 | |
| 9 | 1001 | $S'_{18}$ | $S'_{19}$ | 13 | $S_{18}$ | $S_{19}$ | 17 | |
| 10 | 1010 | $S'_{20}$ | $S'_{21}$ | 20 | $S_{20}$ | $S_{21}$ | 16 | |
| 11 | 0110 | $S'_{22}$ | $S'_{23}$ | 23 | $S_{22}$ | $S_{23}$ | 4 | |
| 12 | 0111 | $S'_{24}$ | $S'_{25}$ | 2 | $S_{24}$ | $S_{25}$ | 9 | |
| 13 | 0010 | $S'_{26}$ | $S'_{27}$ | 13 | $S_{26}$ | $S_{27}$ | 17 | |
| 14 | 0010 | $S'_{28}$ | $S'_{29}$ | 21 | $S_{28}$ | $S_{29}$ | 2 | |
| 15 | 0010 | $S'_{30}$ | $S'_{31}$ | 6 | $S_{30}$ | $S_{31}$ | 13 | |
| 16 | 1111 | $S'_{32}$ | $S'_{33}$ | 7 | $S_{32}$ | $S_{33}$ | 18 | |
| 17 | 1011 | $S'_{34}$ | $S'_{35}$ | 2 | $S_{34}$ | $S_{35}$ | 9 | |
| 18 | 0101 | $S'_{36}$ | $S'_{37}$ | 1 | $S_{36}$ | $S_{37}$ | 20 | |
| 19 | 1011 | $S'_{38}$ | $S'_{39}$ | 24 | $S_{38}$ | $S_{39}$ | 12 | |
| 20 | 0001 | $S'_{40}$ | $S'_{41}$ | 9 | $S_{40}$ | $S_{41}$ | 21 | |
| 21 | 1101 | $S'_{42}$ | $S'_{43}$ | 21 | $S_{42}$ | $S_{43}$ | 2 | |
| 22 | 0010 | $S'_{44}$ | $S'_{45}$ | 6 | $S_{44}$ | $S_{45}$ | 13 | |
| 23 | 0110 | $S'_{46}$ | $S'_{47}$ | 17 | $S_{46}$ | $S_{47}$ | 6 | |
| 24 | 0000 | $S'_{48}$ | $S'_{49}$ | 10 | $S_{48}$ | $S_{49}$ | 3 | |
| 25 | 1011 | $S'_{50}$ | $S'_{51}$ | 17 | $S_{50}$ | $S_{51}$ | 6 | |
| 26 | 1000 | $S'_{52}$ | $S'_{53}$ | 24 | $S_{52}$ | $S_{53}$ | 12 | |
| 27 | 1010 | $S'_{54}$ | $S'_{55}$ | 7 | $S_{54}$ | $S_{55}$ | 18 | State No. becomes 1 directly before SW |
| 28 | 1101 | $S'_{56}$ | $S'_{57}$ | 8 | $S_{56}$ | $S_{57}$ | 15 | |
| 29 | 0010 | $S'_{58}$ | $S'_{59}$ | 16 | $S_{58}$ | $S_{59}$ | 1 | |
| 30 | 1000 | $S'_{60}$ | $S'_{61}$ | 23 | $S_{60}$ | $S_{61}$ | 4 | |
| 31 | 0001 | $S'_{62}$ | $S'_{63}$ | 8 | $S_{62}$ | $S_{63}$ | 15 | Mapping pattern of SW is fixed |
| 32 | 1101 | $S'_{64}$ | $S'_{65}$ | 12 | $S_{64}$ | $S_{65}$ | 5 | |
| 33 | 0111 | $S'_{66}$ | $S'_{67}$ | 23 | $S_{66}$ | $S_{67}$ | 4 | |
| 34 | 0101 | $S'_{68}$ | $S'_{69}$ | 11 | $S_{68}$ | $S_{69}$ | 23 | |
| ... | | | | | | | | |

R,P, TCH random bits: rows 0–29

SW fixed bits: rows 30–34

FIG. 16

Simulation Results(Case2-2)

Initial value:(formula 15)

Initial value:set using conversion table

| | m | Inupt pattern 1 | $S'_{2m}$ | $S'_{2m+1}$ | State No. | | $S_{2m}$ | $S_{2m+1}$ | State No. | |
|---|---|---|---|---|---|---|---|---|---|---|
| | | | $S'_{-2}$ | $S'_{-1}$ | 1 | | $S_{-2}$ | $S_{-1}$ | 19 | |
| | 0 | 0111 | $S'_0$ | $S'_1$ | 8 | | $S_0$ | $S_1$ | 6 | |
| | 1 | 0100 | $S'_2$ | $S'_3$ | 10 | | $S_2$ | $S_3$ | 11 | |
| | 2 | 1000 | $S'_4$ | $S'_5$ | 7 | | $S_4$ | $S_5$ | 17 | |
| | 3 | 0010 | $S'_6$ | $S'_7$ | 4 | | $S_6$ | $S_7$ | 2 | |
| | 4 | 1010 | $S'_8$ | $S'_9$ | 19 | | $S_8$ | $S_9$ | 5 | |
| | 5 | 1110 | $S'_{10}$ | $S'_{11}$ | 8 | | $S_{10}$ | $S_{11}$ | 6 | |
| | 6 | 1010 | $S'_{12}$ | $S'_{13}$ | 23 | | $S_{12}$ | $S_{13}$ | 1 | |
| | 7 | 0100 | $S'_{14}$ | $S'_{15}$ | 18 | | $S_{14}$ | $S_{15}$ | 20 | |
| | 8 | 1010 | $S'_{16}$ | $S'_{17}$ | 17 | | $S_{16}$ | $S_{17}$ | 3 | |
| | 9 | 1000 | $S'_{18}$ | $S'_{19}$ | 24 | | $S_{18}$ | $S_{19}$ | 18 | |
| | 10 | 0110 | $S'_{20}$ | $S'_{21}$ | 19 | | $S_{20}$ | $S_{21}$ | 5 | |
| | 11 | 1110 | $S'_{22}$ | $S'_{23}$ | 8 | | $S_{22}$ | $S_{23}$ | 6 | |
| | 12 | 1011 | $S'_{24}$ | $S'_{25}$ | 14 | | $S_{24}$ | $S_{25}$ | 15 | |
| R,P, TCH random bits | 13 | 1101 | $S'_{26}$ | $S'_{27}$ | 19 | | $S_{26}$ | $S_{27}$ | 5 | |
| | 14 | 1000 | $S'_{28}$ | $S'_{29}$ | 2 | | $S_{28}$ | $S_{29}$ | 8 | |
| | 15 | 1001 | $S'_{30}$ | $S'_{31}$ | 17 | | $S_{30}$ | $S_{31}$ | 3 | |
| | 16 | 0010 | $S'_{32}$ | $S'_{33}$ | 2 | | $S_{32}$ | $S_{33}$ | 8 | |
| | 17 | 0100 | $S'_{34}$ | $S'_{35}$ | 15 | | $S_{34}$ | $S_{35}$ | 10 | |
| | 18 | 0110 | $S'_{36}$ | $S'_{37}$ | 18 | | $S_{36}$ | $S_{37}$ | 20 | |
| | 19 | 0110 | $S'_{38}$ | $S'_{39}$ | 5 | | $S_{38}$ | $S_{39}$ | 23 | |
| | 20 | 1100 | $S'_{40}$ | $S'_{41}$ | 9 | | $S_{40}$ | $S_{41}$ | 12 | |
| | 21 | 0101 | $S'_{42}$ | $S'_{43}$ | 20 | | $S_{42}$ | $S_{43}$ | 22 | |
| | 22 | 1111 | $S'_{44}$ | $S'_{45}$ | 1 | | $S_{44}$ | $S_{45}$ | 19 | |
| | 23 | 0011 | $S'_{46}$ | $S'_{47}$ | 9 | | $S_{46}$ | $S_{47}$ | 12 | |
| | 24 | 0000 | $S'_{48}$ | $S'_{49}$ | 18 | | $S_{48}$ | $S_{49}$ | 20 | |
| | 25 | 0000 | $S'_{50}$ | $S'_{51}$ | 19 | | $S_{50}$ | $S_{51}$ | 5 | |
| | 26 | 1001 | $S'_{52}$ | $S'_{53}$ | 10 | | $S_{52}$ | $S_{53}$ | 11 | |
| | 27 | 1000 | $S'_{54}$ | $S'_{55}$ | 7 | | $S_{54}$ | $S_{55}$ | 17 | |
| | 28 | 0001 | $S'_{56}$ | $S'_{57}$ | 24 | | $S_{56}$ | $S_{57}$ | 18 | |
| | 29 | 1001 | $S'_{58}$ | $S'_{59}$ | 23 | | $S_{58}$ | $S_{59}$ | 1 | State No. becomes 1 directly before SW |
| | 30 | 1000 | $S'_{60}$ | $S'_{61}$ | 6 | | $S_{60}$ | $S_{61}$ | 4 | |
| SW fixed bits | 31 | 0001 | $S'_{62}$ | $S'_{63}$ | 14 | | $S_{62}$ | $S_{63}$ | 15 | Mapping pattern of SW is fixed |
| | 32 | 1101 | $S'_{64}$ | $S'_{65}$ | 19 | | $S_{64}$ | $S_{65}$ | 5 | |
| | 33 | 0111 | $S'_{66}$ | $S'_{67}$ | 6 | | $S_{66}$ | $S_{67}$ | 4 | |
| | 34 | 0101 | $S'_{68}$ | $S'_{69}$ | 5 | | $S_{68}$ | $S_{69}$ | 23 | |
| | | ... | | | | | | | | |

FIG. 22

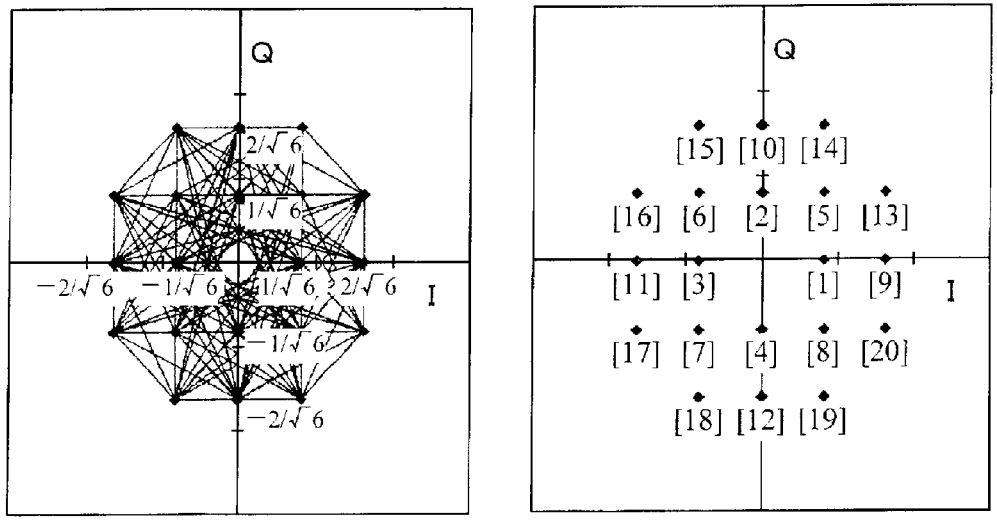

Coordinates of 20 Points

$S = 1/\sqrt{6}\,(1 + j \cdot 0)$   $S = 1/\sqrt{6}\,(0 + j)$ $S = 1/\sqrt{6}\,(-1 + j \cdot 0)$   $S = 1/\sqrt{6}\,(0 - j)$ $S = 1/\sqrt{6}\,(1 + j)$   $S = 1/\sqrt{6}\,(-1 + j)$ $S = 1/\sqrt{6}\,(-1 - j)$   $S = 1/\sqrt{6}\,(1 - j)$ $S = 1/\sqrt{6}\,(2 + j \cdot 0)$   $S = 1/\sqrt{6}\,(0 + j \cdot 2)$ $S = 1/\sqrt{6}\,(-2 + j \cdot 0)$   $S = 1/\sqrt{6}\,(0 - j \cdot 2)$ $S = 1/\sqrt{6}\,(2 + j)$   $S = 1/\sqrt{6}\,(1 + 2 \cdot j)$ $S = 1/\sqrt{6}\,(-1 + j \cdot 2)$   $S = 1/\sqrt{6}\,(-2 + j)$ $S = 1/\sqrt{6}\,(-2 - j)$   $S = 1/\sqrt{6}\,(-1 - j \cdot 2)$ $S = 1/\sqrt{6}\,(1 - j \cdot 2)$   $S = 1/\sqrt{6}\,(2 - j)$ j is the imaginary unit

FIG. 23

| State No. | $S_{2m}$ | $S_{2m+1}$ |
|---|---|---|
| 1 | [1] | [13] |
| 2 | [1] | [18] |
| 3 | [2] | [15] |
| 4 | [2] | [20] |
| 5 | [3] | [14] |
| 6 | [3] | [17] |
| 7 | [4] | [16] |
| 8 | [4] | [19] |
| 9 | [5] | [11] |
| 10 | [6] | [12] |
| 11 | [7] | [9] |
| 12 | [8] | [10] |
| 13 | [9] | [8] |
| 14 | [10] | [5] |
| 15 | [11] | [6] |
| 16 | [12] | [7] |
| 17 | [13] | [2] |
| 18 | [14] | [4] |
| 19 | [15] | [3] |
| 20 | [16] | [1] |
| 21 | [17] | [4] |
| 22 | [18] | [2] |
| 23 | [19] | [1] |
| 24 | [20] | [3] |

[1] to [20] indicate the numbers of the mapping points

000# TRANSMITTER, RECEIVER, COMMUNICATION SYSTEM, AND COMMUNICATION METHOD

TECHNICAL FIELD

The present invention relates to a transmitter, a receiver, a communication system, and a communication method for communication by Space-Time Block Coding (STBC) method or the Differential Space-Time Block Coding (DSTBC) method, and in particular, to a technology for effective communication.

BACKGROUND ART

Technologies for communication by of the STBC method or the DSTBC method, for example, have been examined. For example, already known signals made up of data signals to be communicated and synchronous words or sync words (SWs) as well as data signals to be communicated are provided in a frame to be communicated, wherein the data signals other than the already known signals are encoded by the STBC method or the DSTBC method.

PRIOR ART DOCUMENT

Patent Document

Patent Document 1: Japanese Unexamined Patent Publication 2009-303086

SUMMARY OF THE INVENTION

Problem to be Solved by the Invention

Further developments have been required for the STBC method and the DSTBC method. The present invention is provided in view of the conventional circumstances, and an object thereof is to provide a transmitter, a receiver, a communication system, and a communication method that make effective communication possible by of the STBC method or the DSTBC method.

Means for Solving Problem (Description of One Example of the Structure of the Transmitter) In order to achieve the above-described object, the present invention provides the following structure of the transmitter for transmitting signals by the STBC method or the DSTBC method. That is to say, a frame in which synchronous words are arranged at specified positions is used. An encoding encodes the entirety of the above-described frame to be transmitted, including the above-described synchronous words, by the STBC method or the DSTBC method.

Accordingly, the STBC method or the DSTBC method makes effective communication possible by encoding the entirety of the frame. An example of the communication used here is wireless communication. In addition, rear positions instead of the leading positions in the frame are used as the specified positions at which synchronous words are arranged in the frame, and the leading positions in the frame may be used in another example of the structure.

(Description of One Example of the Structure of the Receiver) In order to achieve the above-described object, the present invention provides the following structure of the receiver for receiving signals transmitted by the DSTBC method. That is to say, a frame in which synchronous words are arranged at specified positions is used. On the transmitting side, the entirety of the above-described frame to be transmitted, including the above-described synchronous words, is encoded by the DSTBC method. In the receiver, a receiving unit which receives signals transmitted from the transmitting side. An A/D converting unit A/D converts signals received by the above-described receiving unit. A downsampling unit downsamples (thins) the received signals after being A/D converted by said A/D converting unit. A first DSTBC decoding unit decodes by the DSTBC method the signals downsampled by said downsampling unit. A second DSTBC decoding unit decodes by the DSTBC method the received signals after A/D conversion by the above-described A/D converting unit and before being downsampled by the above-described downsampling unit. A synchronous word information storing unit stores information corresponding to the above-described synchronous words before being encoded by the DSTBC method. A correlation value acquiring method acquires a correlation value between the signals resulting from the decoding that have been acquired by the above-described second DSTBC decoding unit and the signals for the information corresponding to the above-described synchronous words stored in the above-described synchronous word information storing unit. A sampling timing control unit controls the sampling timing for the above-described A/D converting unit on the basis of the correlation value acquired by the above-described correlation value acquiring unit.

Accordingly, the DSTBC method makes effective communication possible by carrying out DSTBC decoding for each sample so as to control the sampling timing on the basis of the correlation value concerning the synchronous words. Examples of the transmission and reception used here are wireless transmission and reception. In addition, rear positions instead of the leading positions in the frame are used as the specified positions at which synchronous words are arranged in the frame, and the leading positions in the frame may be used in another example of the structure. An example of the storing unit used in the structure is a memory.

(Description of Another Example of the Structure of the Receiver) In order to achieve the above-described object, the present invention provides the following structure of the receiver for receiving signals transmitted by the STBC method or the DSTBC method. That is to say, a frame in which synchronous words are arranged at specified positions is used. On the transmitting side, the entirety of the above-described frame to be transmitted, including the above-described synchronous words, is encoded by the STBC method or the DSTBC method. The signals that correspond to the above-described synchronous words after the above-described encoding on the transmitting side become of a specified pattern (fixed constant pattern, for example). In the receiver, a receiving unit receives signals transmitted from the transmitting side. An A/D converting unit A/D converts signals received by the above-described receiving unit. A decoding unit decodes the signals after A/D conversion by the above-described A/D converting unit by the STBC method or the DSTBC method. A synchronous word information storing unit stores the information that corresponds to the above-described synchronous words after being encoded by the STBC method or the DSTBC method (information that corresponds to the above-described specified pattern). A correlation value acquiring unit acquires a correlation value between the signals after A/D conversion by the above-described A/D converting unit and before being decoded by the above-described decoding unit and the signals for the information that corresponds to the above-described synchronous words stored in the above-described synchronous word information storing unit. A sampling timing control unit controls the sampling timing for the above-described A/D converting unit on the basis of the correlation value acquired by the above-described correlation value acquiring unit.

Accordingly, the STBC method or the DSTBC method makes effective communication possible by controlling the sampling timing on the basis of the correlation value concerning the synchronous words without carrying out STBC decoding or DSTBC decoding for each sample, for example. Examples of the transmission and reception used here are wireless transmission and reception. In addition, rear positions instead of the leading positions in the frame are used as the specified positions at which synchronous words are arranged in the frame, and the leading positions in the frame may be used in another example of the structure. An example of the storing unit used in the structure is a memory.

Furthermore, there are two series of signals transmitted from the transmitting side in the STBC method or the DSTBC method (series A, series B), for example, and therefore, the synchronous word information storing unit and the correlation value acquiring unit have functions for carrying out a process for each series. In this case, the sampling timing controlling unit controls the correlation values in these two groups on the basis of the sum, the sum of the values squared, the average value, and the like.

(Description of One Example of the Structure of the Communication System) In order to achieve the above-described object, the present invention provides the following structure of the communication system for transmitting signals from the transmitter to the receiver by of the STBC method or the DSTBC method. That is to say, a frame where synchronous words are arranged at specified positions is used. In the above-described transmitter, an encoding unit encodes the entirety of the above-described frame to be transmitted, including the above-described synchronous words, by the STBC method or the DSTBC method.

Accordingly, the STBC method or the DSTBC method makes effective communication possible by encoding the entirety of the frame. An example of the communication (transmission or reception) used here is wireless communication. In addition, rear positions instead of the leading positions in the frame are used as the specified positions at which synchronous words are arranged in the frame, and the leading positions in the frame may be used in another example of the structure.

(Description of One Example of the Structure of the Communication Method) In order to achieve the above-described object, the present invention provides the following structure of the communication method for transmitting signals from the transmitter to the receiver by the STBC method or the DSTBC method. That is to say, a frame in which synchronous words are arranged at specified positions is used. In the above-described transmitter, the entirety of the above-described frame to be transmitted, including the above-described synchronous words, is encoded by the STBC method or the DSTBC method.

Accordingly, the STBC method or the DSTBC method makes effective communication possible by encoding the entirety of the frame. An example of the communication (transmission or reception) used here is wireless communication. In addition, rear positions instead of the leading positions in the frame are used as the specified positions at which synchronous words are arranged in the frame, and the leading positions in the frame may be used in another example of the structure.

Effect of the Invention

As described above, according to the present invention, the STBC method or the DSTBC method makes effective communication possible.

BRIEF DESCRIPTION OF THE DRAWINGS

FIG. 6(a) is a graph showing an example of a simulation calculation of the squared correlation value in the synchronous state following the timing synchronization (Case 1);

FIG. 6(b) is a graph showing an example of a simulation calculation of the squared correlation value in the synchronous state following the timing synchronization (Case 2);

FIG. 10 is a table showing an example of the simulation results (Case 1-1);

FIG. 11 is a table showing an example of the simulation results (Case 1-2);

FIG. 12 is a diagram showing an example of the signal arrangement in a differential encoding unit in the second simulation;

FIG. 13 is a table showing an example of the combinations of the arrangement of signals $S_{2m}$ and $S_{2m+1}$ in the second simulation;

FIG. 15 is a table showing an example of the simulation results (Case 2-1);

FIG. 16 is a table showing an example of the simulation results (Case 2-2);

FIG. 22 is a diagram showing an example of the arrangement of signals in DSTBC; and FIG. 23 is a table showing an example of the combinations of the arrangement of signals $S_{2m}$ and $S_{2m+1}$.

PREFERRED EMBODIMENTS OF THE INVENTION

The preferred embodiments according to the present invention are described below in reference to the drawings.

First Embodiment

The first embodiment of the present invention is described below. A transmitter for wireless communication by the STBC method and a transmitter for wireless communication by the DSTBC method are described in the present embodiment. It is also possible to implement a wireless communication system with a transmitter having the same characteristics as in the present embodiment or a wireless communication method (transmission method, for example) having the same characteristics as in the present embodiment. Here, digital communication is carried out in the present embodiment.

One example of a unit for improving the quality of reception by mobile station units when a base station unit and mobile bodies (mobile station units) communicate with each other is a transmission diversity method according to the STBC method. The STBC method is a method for arithmetic operation on the time series data to be transmitted using two symbols as one process unit so as to transmit the signals that have been recombined in time and space regions from two antennas, where two types of series that are orthogonal to each other (series A, which is a first series, and series B, which is a second series) are outputted from the two antennas.

Figure 1A:
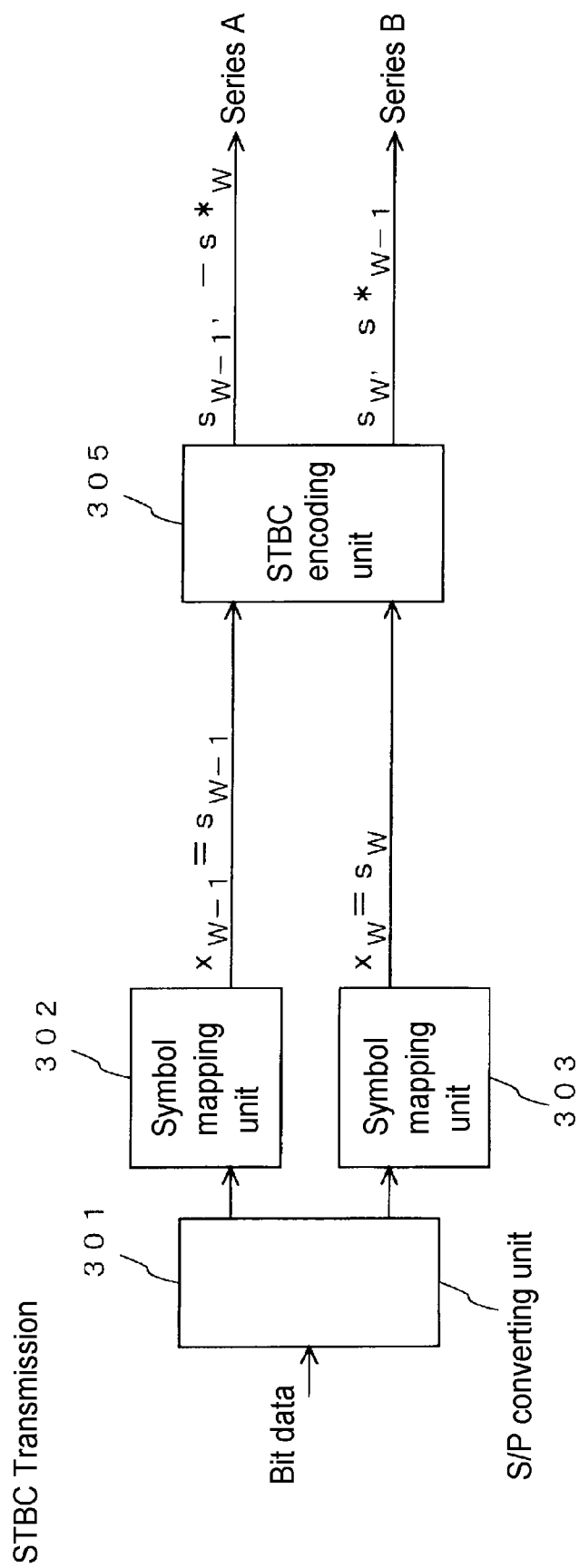
FIG. 1(a) is a diagram showing an example of the structure of the STBC transmitter according to one embodiment (first embodiment) of the present invention.

FIG. 1(a) shows an example of the structure of the transmitting unit (STBC transmitting unit) provided in the transmitter for wireless communication by the STBC method according to one embodiment of the present invention. Here, an example of the structure concerning the base band unit is shown in the present embodiment. The STBC transmitting unit in the present embodiment is provided with an S/P (serial to parallel) converting unit 301 for collecting two symbols in one processing unit for the bit data to be inputted, two symbol mapping units 302 and 303 for symbol mapping the two outputs from the S/P converting unit 301, respectively, and an STBC encoding unit 305 for encoding by the STBC method by recombining the signals in time and space regions concerning the outputs $x_{w-1}=s_{w-1}$ and $x_w=s_w$ from the two symbol mapping units 302 and 303. Signals $s_{w-1}$ and $-s_w*$ in series A and signals $s_w$ and $s_{w-1}*$ in series B are outputted from the STBC encoding unit 305.

Here, the bit data to be inputted includes synchronous words (SWs). In addition, w (number attached to the symbol) is a time series number starting from 0 that changes for each symbol time and is cleared to zero (0) at the beginning of the frame.

Here, transmission diversity can be realized by the STBC method without using the channel state information (CSI) in the transmitting unit, and therefore, the STBC method is effective under the fading environment, but CSI is required on the receiving unit side. The CSI is propagation characteristics when signals propagate through a space or the like and can be estimated on the receiving side using a training signal or the like when the fluctuation thereof is gradual. In the case where it is applied to the communication system where the receiving unit moves at a high speed, however, the parameters fluctuate during training, and therefore, application is difficult.

Therefore, a DSTBC method where no CSI is required for the transmitting unit and the receiving unit has been proposed. In the DSTB method, CSI is unnecessary on the receiving unit side as well, and therefore, the DSTBC method is effective under the high speed fading environment, which cannot be followed by the STBC method. A transmission diversity method by the DSTBC method can also be used.

Figure 1B:
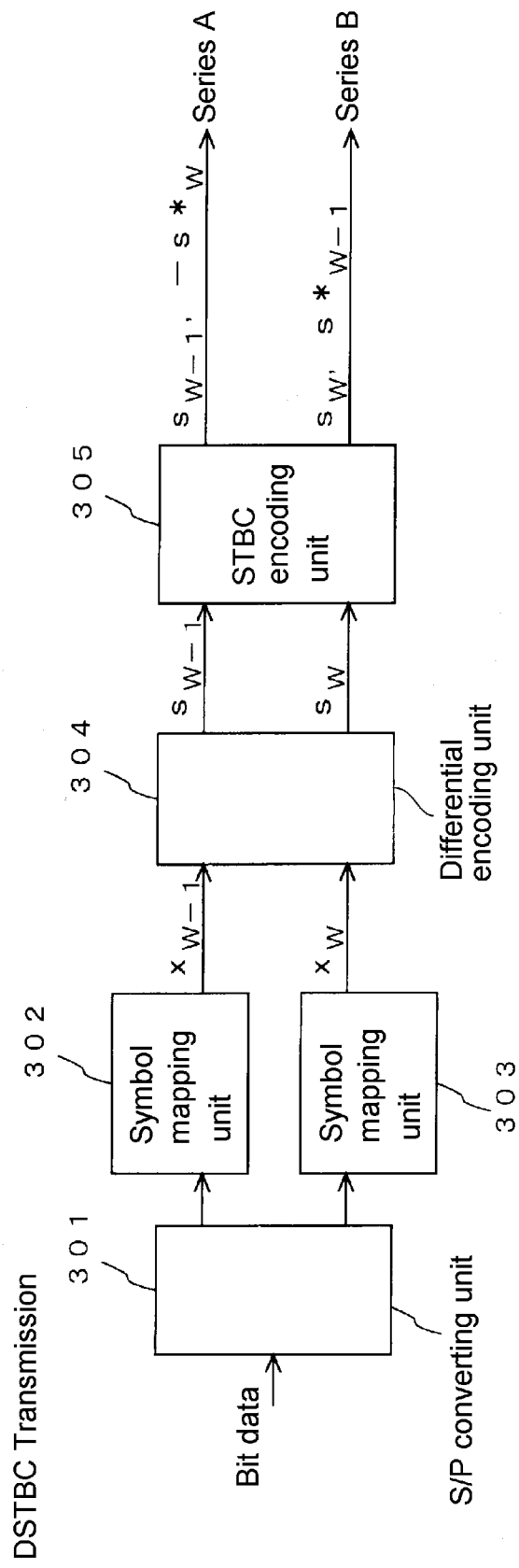
FIG. 1(b) is a diagram showing an example of the structure of the DSTBC transmitter according to one embodiment (first embodiment) of the present invention.

FIG. 1(b) shows an example of the structure of a transmitting unit (DSTBC transmitting unit) provided in a transmitter for wireless communication by the DSTBC method according to one embodiment of the present invention. Here, an example of the structure concerning the base band unit is shown in the present embodiment. The structure of the DSTBC transmitting unit in the present embodiment is the same as the structure of the STBC transmitting unit in FIG. 1(a), except the point where a differential encoding unit 304 is provided between the two symbol mapping units 302, 303 and the STBC encoding unit 305. Here, the same symbols are attached to these processing units 301 to 303 and 305 that are approximately the same for the convenience of description in the present embodiment.

In the DSTBC transmitting unit in the present embodiment, the differential encoding unit 304 differentially encodes the outputs $x_{w-1}$ and $x_w$ from the two symbol mapping units 302 and 303, and the STBC encoding unit 305 recombines signals in the time and space regions for the two outputs $s_{w-1}$ and $s_w$ from the differential encoding unit 304 so as to carry out the encoding by the STBC method, and thus, the signals $s_{w-1}$ and $-s_w*$ in series A and the signals $s_w$ and $s_{w-1}*$ in series B are outputted.

In the STBC transmitting unit and in the DSTBC transmitting unit, the signal pattern in the first series (series A) transmitted from the first antenna (antenna A) and the signal pattern in the second series (series B) transmitted from the second antenna (antenna B) are orthogonal to each other and have the same signal frequency.

The main characteristics of the STBC transmitting unit and the DSTBC transmitting unit in the present embodiment are described below. In the present embodiment, data signals to be communicated, signals of synchronous words (SWs), and data signals to be communicated are arranged at the frame to be communicated, and the entirety of the frame is encoded by the STBC method or the DSTBC method.

Figure 2A:
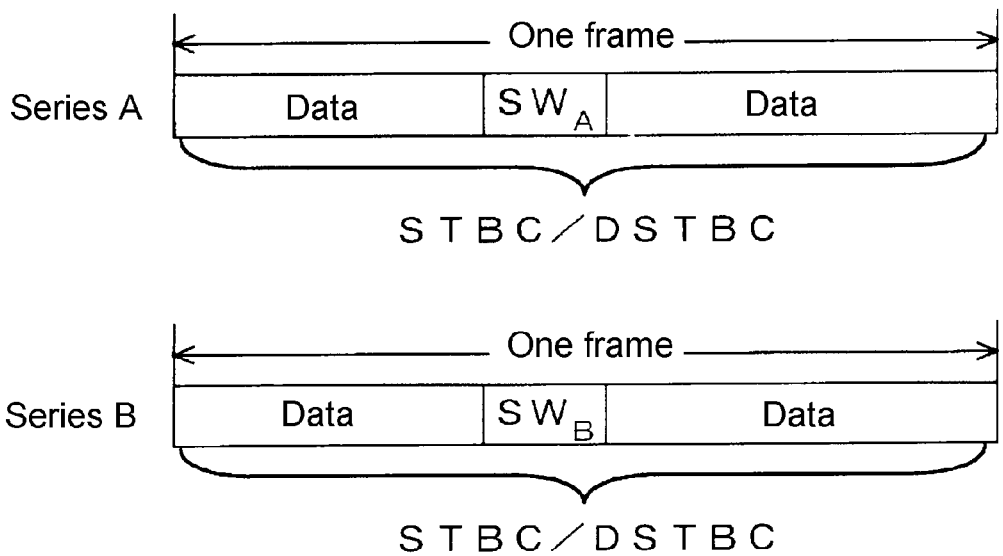
FIG. 2(a) is a diagram showing an example of the way of encoding in the present example (proposed method)

FIG. 2(a) shows an example of the way of encoding in the present embodiment (proposed method). In the present embodiment, one frame in the series A is formed of data signals in the series A, synchronous word signals in the series A ($SW_A$), and data signals in the series A. In addition, the entirety of one frame, including the synchronous word signals, is encoded by the STBC method in the STBC transmitting unit or is encoded by the DSTBC method in the DSTBC transmitting unit. Likewise, in the present embodiment, one frame in the series B is formed of data signals in the series B, synchronous word signals in the series B ($SW_B$), and data signals in the series B. In addition, the entirety of one frame, including the synchronous word signals, is encoded by the STBC method in the STBC transmitting unit or is encoded by the DSTBC method in the DSTBC transmitting unit.

Figure 2B:
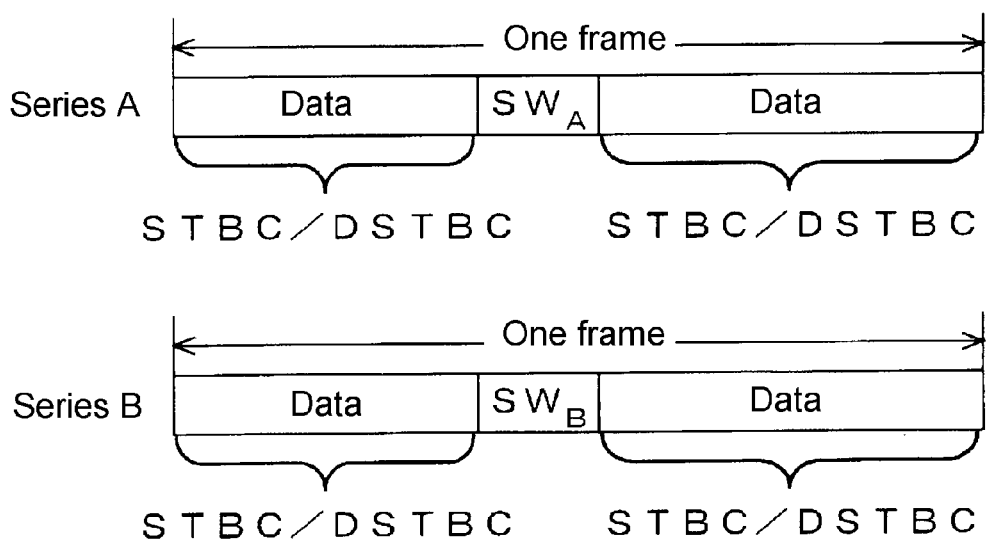
FIG. 2(b) is a diagram showing an example of the way of encoding according to a comparative method.

FIG. 2(b) shows an example of the way of encoding by a comparative method for reference. In the comparative method, the structure of the frame is the same as that in the present embodiment in FIG. 2(a), but only the data signals in the series A and in the series B are encoded by the STBC method or by the DSTBC method, and the synchronous word signals are not encoded. Therefore, the synchronous word signals in the series A ($SW_A$) and the synchronous word signals in the series B ($SW_B$) are the same signals.

Figure 2C:
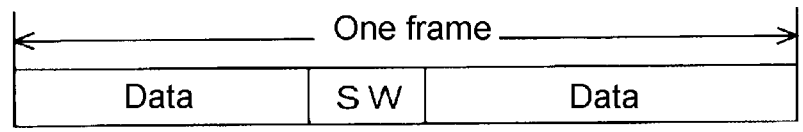
FIG. 2(c) is a diagram showing an example of the structure of the bit data frame to be inputted.

FIG. 2(c) shows an example of the structure of the bit data frame inputted into the S/P converting unit 301 in FIGS. 1(a) and 1(b). In the present embodiment, one frame is formed of data signals, synchronous word signals (SWs), and data signals. The structure of this frame shares the same format in the series A and in the series B, and the proposed method in FIG. 2(a) and the comparative method in FIG. 2(b) share the same format.

Here, the structure in the present embodiment is applied to a case where synchronous word signals are arranged in positions other than at the beginning of the wireless frame format (portions behind the beginning), for example, but may be applied to a case where the synchronous word signals are arranged in positions at the beginning of the frame.

As described above, the entirety of the communication frame is STBC encoded or DSTBC encoded as in the present embodiment so that effective communication can be achieved, and the following (Example of Effect 1) and (Example of Effect 2) can be gained as typical examples. (Example of Effect 1) The diversity effect can be gained not only for the portion of the data signals, but also for the portion of synchronous word signals ($SW_A$, $SW_B$) in terms of the STBC encoding and the DSTBC encoding. In contrast, the diversity effect can be gained only for the portion of the data signals in the comparative method in FIG. 2(b).

(Example of Effect 2) The initial two symbol portion of the data signals following the synchronous word signals ($SW_A$, $SW_B$) can be used for communication in terms of the DSTBC encoding. In contrast, the synchronous word signals are not DSTBC encoded in the comparative method in FIG. 2(b), and therefore, the initial two symbol portion of the data signals following the synchronous word signals becomes uncertain, and thus cannot be used for communication. Here, in FIGS. 2(a) and 2(b), the beginning two symbol portion for the encoding (the initial two symbol portion of the beginning data signal as a portion shared by these, for example) usually becomes uncertain and cannot be used for communication in the DSTBC method.

Here, in the STBC transmitting unit in the transmitter using the STBC method in the present embodiment in FIG. 1(a), the STBC encoding unit 305 functions to form an encoding unit. In addition, in the DSTBC transmitting unit in the transmitter using the DSTBC method in the present embodiment in FIG. 1(b), the differential encoding unit 304 and the STBC encoding unit 305 function to form an encoding unit.

Second Embodiment

The second embodiment of the present invention is described below. In the present embodiment, a receiver for wireless communication by the DSTBC method is described below. It is also possible to implement a wireless communication system provided with a receiver having the same characteristics as in the present embodiment and a wireless communication method (reception method, for example) having the same characteristics as in the present embodiment. Here, in the present embodiment, digital communication is carried out. In addition, in the present embodiment, a case where the entirety of the communication frame (including synchronous word signals) is encoded by the DSTBC method on the transmitting side before being transmitted is hypothetically shown as in the first embodiment.

In the communication technology using the DSTBC method, for example, it is assumed that the signals are in sync with the symbol timing on the receiving side, and a general technique for making the signals be in sync with the symbol timing has not been well established. Here, the symbol timing unit the timing according to which information (symbols) is attached to signals on the transmitting side, and the information cannot be decoded unless the signals are in sync with this timing on the receiving side.

Figure 3:
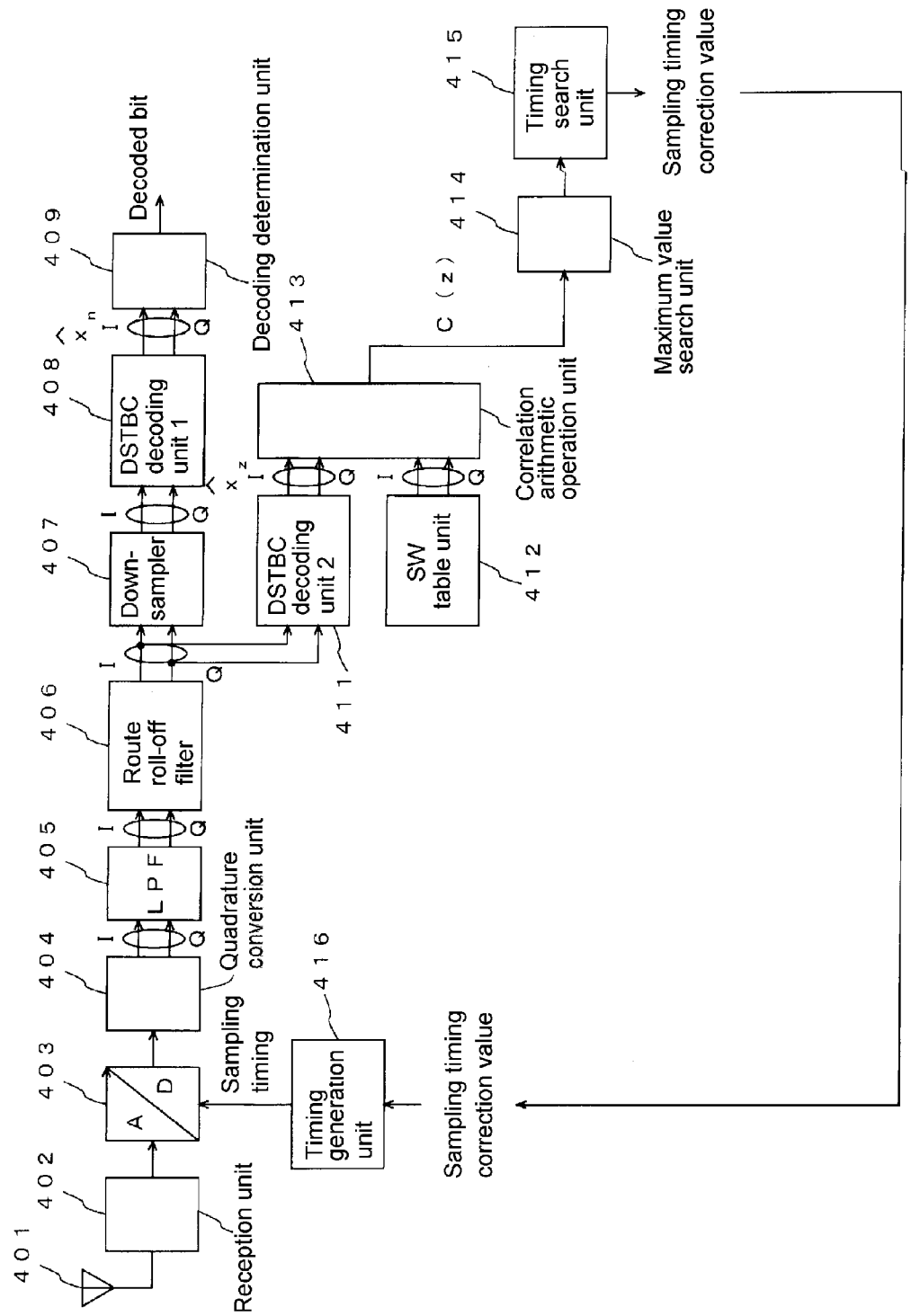
FIG. 3 is a diagram showing an example of the structure of the DSTBC receiver according to one embodiment (second embodiment) of the present invention.

FIG. 3 shows an example of the structure of a receiving unit (DSTBC receiving unit) provided in the receiver for wireless communication by the DSTBC method according to one embodiment of the present invention. The DSTBC receiving unit in the present embodiment is provided with an antenna for reception 401, a reception unit 402, an A/D (analog to digital) converter 403, a quadrature conversion unit 404, a low pass filter (LPF) 405, a route roll-off filter 406, a downsampler 407, a first DSTBC decoding unit 408, decoding determination unit 409, a second DSTBC decoding unit 411, an SW table 412, a correlation arithmetic operation unit 413, a maximum value search unit 414, a timing detection unit 415, and a timing generation unit 416.

The antenna 401 receives a signal of a DSTBC modulated wave wirelessly transmitted from the transmitting side. The reception unit 402 converts a signal with the received frequency that has been received by the antenna 401 to a signal of a desired intermediate frequency (IF). The A/D converter 403 converts the signal gained by the reception unit 402 from an analog signal to a digital signal. The process that follows is a digital signal process.

The quadrature conversion unit 404 converts the frequency of the digital signal gained by the A/D converter 403 (received data with IF) to a base band, which is outputted as components of an in-phase value I and a quadrature value Q. The LPF 405 removes the image components for the IF from the signal gained by and outputted from the quadrature conversion unit 404. The route roll-off filter 406 filters the signal gained by the LPF 405.

The downsampler 407 carries out a downsampling (thinning) process on the signal gained by the route roll-off filter 406. Typically, a thinning process of 1/M is carried out on the (number of oversamples)=(sampling frequency)/(transmission symbol rate)=M on the basis of the relationship between the sampling frequency of the A/D converter 403 and the frequency of the transmission symbol rate. Here, in the thinning process, symbol points are extracted, and the sample point where the eye pattern of the IQ opens the most is selected during one symbol time while the other points are discarded, for example.

The first DSTBC decoding unit 408 carries out an arithmetic operation shown by the (formula 1) on the signal gained by the downsampler 407 once per two symbol times. As a result, the differential encoding and the STBC encoding carried out on the transmitting side are both decoded.

$$\begin{bmatrix} \hat{x}_{w-1} \\ \hat{x}_w \end{bmatrix} = \frac{1}{|r_{w-3}|^2 + |r_{w-2}|^2} \begin{bmatrix} r^*_{w-3} & r_{w-2} \\ r^*_{w-2} & -r_{w-3} \end{bmatrix} \begin{bmatrix} r_{w-1} \\ r^*_w \end{bmatrix} \quad \text{[Formula 1]}$$

Following, the formula $\hat{x}_w = hx_w$ is placed for explanation purpose.

Here, w (number attached to the symbol) is a time series number starting from 0 that changes for each symbol time and is cleared to zero (0) at the beginning of the frame. In the present embodiment, the output of the downsampler 407 is the standard point (reference) for w. In addition, in the present embodiment, arithmetic operation is carried out according to (formula 1) when w is an odd number. The results of the arithmetic operation $hx_0$, $hx_1$ when w=1 at the beginning of the frame are uncertain, and thus are not guaranteed. In addition, $r_w$ is a complex number that can be represented by $r_w$=I+jQ (j is the imaginary unit) using the value of the output IQ from the downsampler 407 at the symbol time w. In addition, * is an operator that represents a conjugate complex number. Furthermore, $hx_{w-1}$ and $hx_w$ are output signals from the first DSTBC decoding unit 408 and estimated values of the outputs $x_{w-1}$ and $x_w$ from the symbol mapping unit 302, 303 in the DSTBC transmitting unit in FIG. 1(b), and thus are complex numbers.

The decoding determination unit 409 decodes and outputs the bit data (estimate of the bit data transmitted from the transmitting side) from the results of the signal decoding of $hx_w$ that has been gained by the first DSTBC decoding unit 408.

The second DSTBC decoding unit 411 carries out the same arithmetic operation as in (formula 1) on the signal gained by the route roll-off filter 406. As a result, the differential encoding and the STBC encoding carried out on the transmitting side are both decoded. Here, the main function of the second DSTBC decoding unit 411 is the same as of the first DSTBC decoding unit 408, but the timing in the arithmetic operation is different. In the second DSTBC decoding unit 411, one collective arithmetic operation is carried out on each frame, for example, for the input that has not been downsampled in accordance with the timing before or after the synchronous word (SW) signals. In the following descriptions, (formula 2) that has been rewritten by expanding (formula 1) to the dimensions in the sample time is referred to as the basic formula for the second DSTBC decoding unit 411.

$$\begin{bmatrix} \hat{x}_{z-M} \\ \hat{x}_z \end{bmatrix} = \frac{1}{|r_{z-3M}|^2 + |r_{z-2M}|^2} \begin{bmatrix} r^*_{z-3M} & r_{z-2M} \\ r^*_{z-2M} & -r_{z-3M} \end{bmatrix} \begin{bmatrix} r_{z-M} \\ r^*_z \end{bmatrix} \quad \text{[Formula 2]}$$

Following, the formula $\hat{x}_z = hx_z$ is placed for explanation purpose.

Here, M is the number of oversamples. In addition, z (number attached to the sample) is a time series number that changes for each sample time starting from 0 and is cleared to zero (0) at the beginning of the frame. In the present embodiment, z is in the relationship of z/M=w when z mod M=0 (mod is a modulo operator) when the output of the route roll-off filter 406 is the standard point (reference). In addition, $r_z$ is a complex number that can be represented by $r_z$=I+jQ (j is the imaginary unit) using the value of the output IQ from the route roll-off filter 406 at the sampling time z. Furthermore, $hx_z$ is an output signal from the second DSTBC decoding unit 411.

The SW table unit 412 holds (stores) in a table the signal arrangement that corresponds to the bit pattern of the synchronous words (SWs), that is to say, the outputs I, Q from the symbol mapping units 302, 303 that correspond to the bit pattern of the synchronous words in the DSTBC transmitting unit as in FIG. 1(b), for example, which are used as the reference signal for the correlation arithmetic operation unit 413. In the present embodiment, the synchronous words in the frame have a length of 10 symbols and can hold reference signal arrangements $c_0$ to $c_9$ (complex numbers).

The correlation arithmetic operation unit 413 uses the results $hx_z$ of the signal decoding outputted from the second DSTBC decoding unit 411 and the reference signal arrangements $c_0$ to $c_9$ outputted from the SW table unit 412 so as to carry out the correlation arithmetic operation in (formula 3).

$$C(z) = \sum_{i=0}^{9} \hat{x}_{z+M \cdot i} \cdot c^*_i \quad \text{[Formula 3]}$$

Here, C(z) is an output (correlation value) from the correlation arithmetic operation unit 413. In addition, $c_i$ (i=0, 1, 2 ... 9) corresponds to the signal arrangement of the synchronous words and is stored in the table held by the SW table unit 412.

The maximum value search unit 414 finds in (formula 4) the maximum value $C_{MAX}$, which is the squared value of the output C(z) from the correlation arithmetic operation unit 413, as well as the sample number K of this maximum value.

$$C_{MAX} = \max |C(z)|^2 \quad \text{[Formula 4]}$$
$$K = \{z \text{ meets the condition for } |C(z)|^2 = C_{MAX}\}$$

The timing detection unit 415 calculates the timing error in the sampling timing on the basis of the results of the sample number K when the maximum value is outputted from the maximum value search unit 414 and outputs a correction value for the sampling timing. The timing generation unit 416 adjusts the sampling timing for the A/D converter 403 on the basis of the correction value for the sampling timing (information on the timing error) outputted from the timing detection unit 415.

An example of the operation carried out in the DSTBC receiving unit in the present embodiment is described below. The processes carried out on the DSTBC modulated waves received by the reception antenna 401 from the reception unit 402 to the downsampler 407 are the same processes as in the receiving unit for general digital wireless communication, for example, and the descriptions of the operations in detail are omitted. In the DSTBC receiving unit in the present embodiment, the symbols are decoded from the inputs that have been downsampled through the arithmetic operation in (formula 1) in the first DSTBC decoding unit 408 and decoded into bit codes in the decoding determination unit 409 so as to be outputted.

Here, such a problem arises with a general wireless system that there is a difference, even though it is slight, in the precision of the internal frequencies and the timing signals on the transmitting side and on the receiving side due to the difference in the structure of the hardware between the two. The former requires an automatic frequency control (AFC) process, and the latter requires a timing synchronization following process so that the process on the receiving side follows the precision on the transmitting side. On the receiving side, the received signal is analyzed so that the internal frequency and the timing precision are adjusted, and these processes use the signal arrangements of the synchronous words (SWs) of which the bit pattern is fixed (already known on the receiving unit side) as a reference signal.

In the DSTBC receiving unit in the present embodiment, the second DSTBC decoding unit 411, the SW table unit 412, and other units up to and including the timing generation unit 416 are process blocks for following the timing synchronization. The operations thereof are described below. The second DSTBC decoding unit 411 decodes signals for each sample using (formula 2). The correlation arithmetic operation unit 413 uses (formula 3) for calculation through the correlation arithmetic operation of the results of decoding by the second DSTBC decoding unit 411 and the reference signal for the synchronous words held by the SW table unit 412. The maximum value search unit 414 compares the size of the results of the correlation arithmetic operation of the results of signal decoding for each sample of the received signal and the arrangements of the reference signal so that the sample having the signal arrangements closest to the reference signal can be detected. Typically, the maximum value search unit 414 calculates the squared value of the output from the correlation arithmetic operation unit 413 so as to find $C_{MAX}$ and K in (formula 4).

Figure 4A:
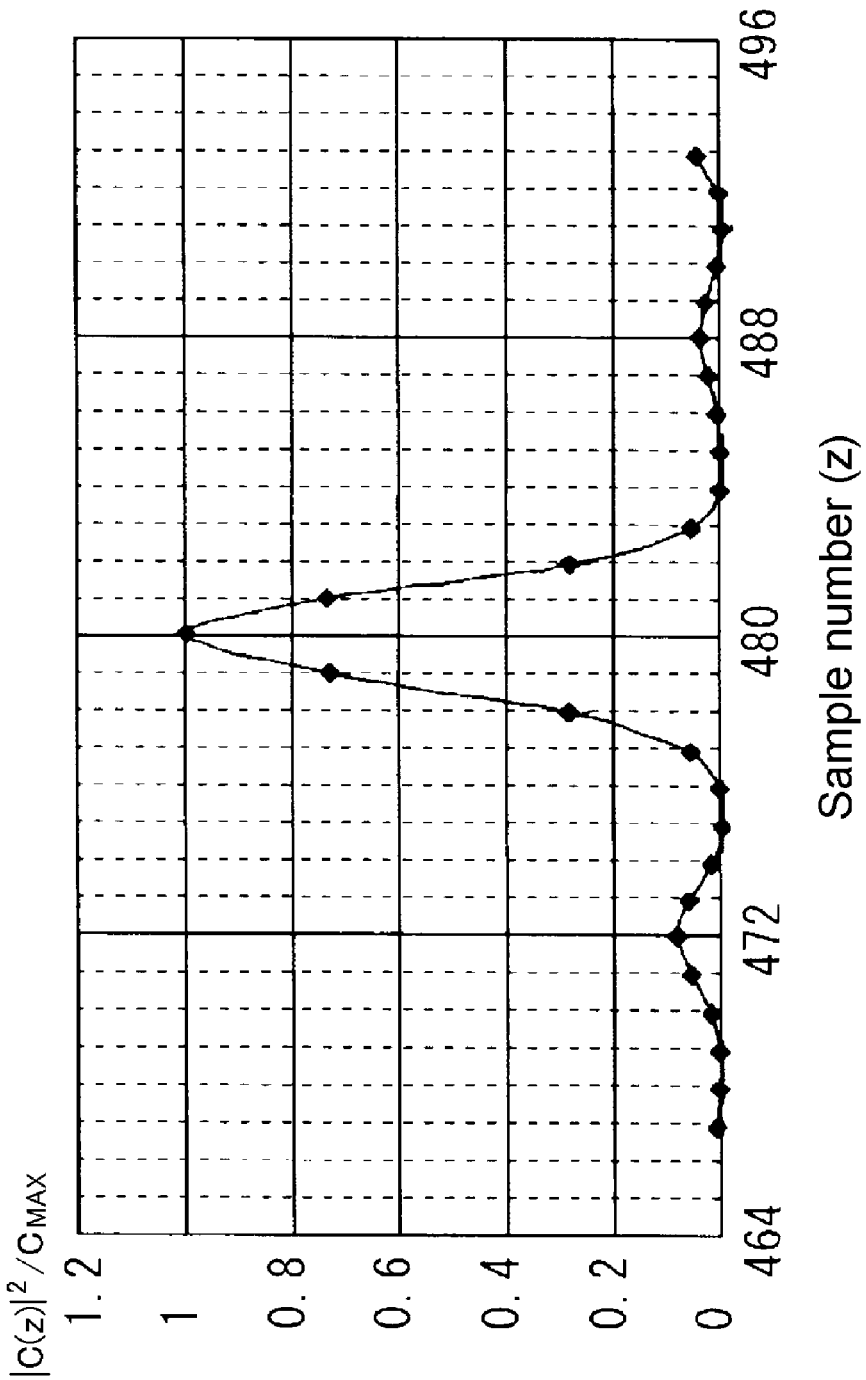
FIG. 4(a) is a graph showing an example of a simulation calculation of the squared correlation value in the synchronous state following the timing synchronization.
Figure 4B:
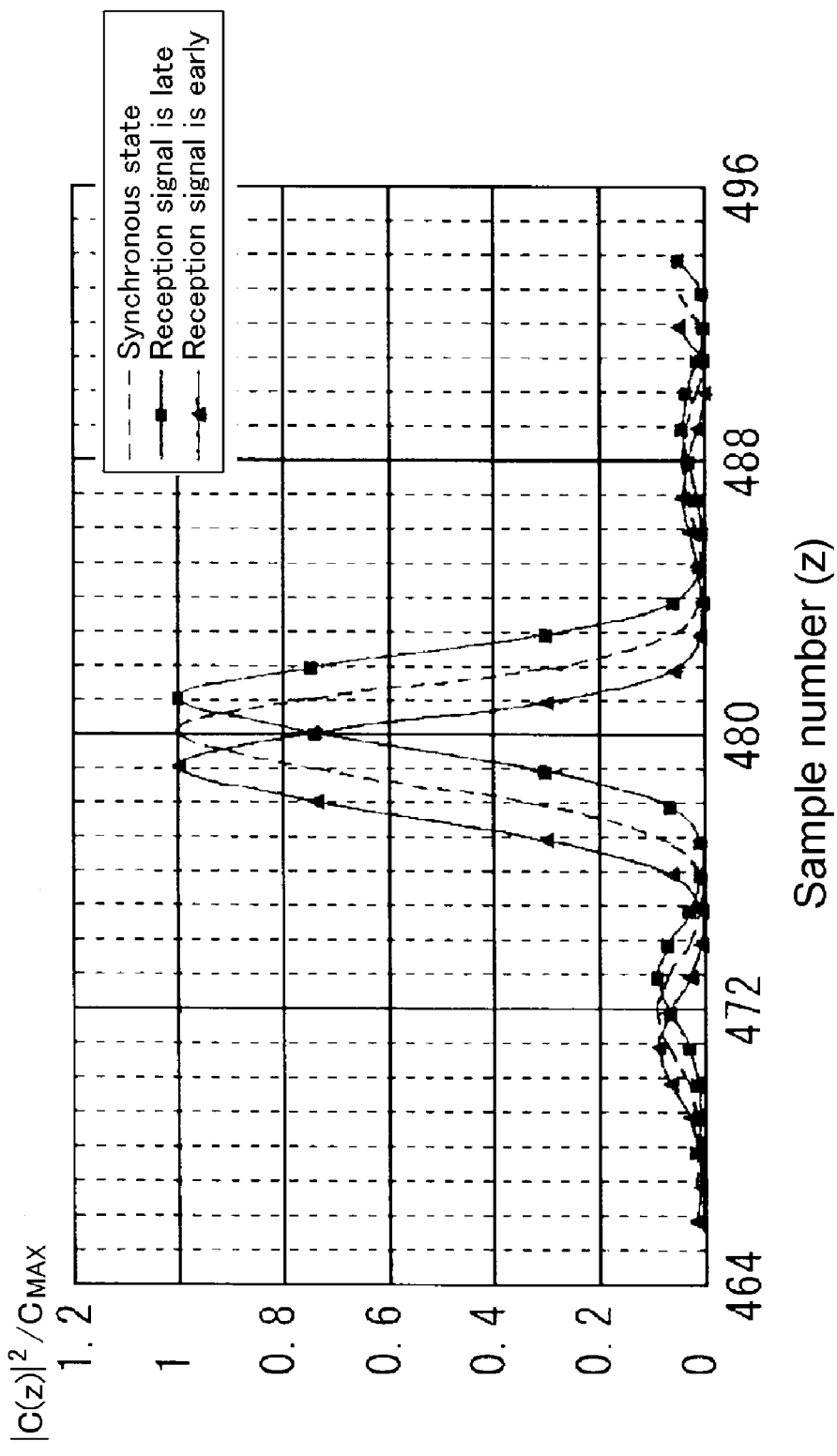
FIG. 4(b) is a graph showing an example of the relationship between the received signal and the timing in the receiver.

An example of the calculation for the squared correlation value in the DSTBC method is shown in reference to FIGS. 4(*a*) and 4(*b*). FIG. 4(*a*) shows an example of the calculation for the squared correlation value in the synchronous state following the timing synchronization in the present embodiment. In the present embodiment, M=8, and a case of the synchronous words (SWs) starting at the $60^{th}$ symbol from the beginning in the frame is shown. FIG. 4(*b*) shows an example of the relationship between the received signal and the timing in the receiving unit. In the present embodiment, the relationship in the synchronous state, the relationship when the received signal is late, and the relationship when the received signal is early are shown. In the graphs in FIGS. 4(*a*) and 4(*b*), the lateral axis shows the sample number (z) and the longitudinal axis shows $|C(z)|^2/C_{MAX}$.

In the state where the received signal and the timing for the process in the receiving unit are completely in sync as shown in FIG. 4(*a*), z that makes $|C(z)|^2$ have the maximum value (=K) is 8×60=480. As shown in FIG. 4(*b*), however, the value of K is greater than 480 in the case where the received signal (that is to say, the timing in the transmitting unit) is late relative to the (internal) timing in the receiving unit, and in contrast, the value of K is smaller than 480 in the case where the received signal is early relative to the (internal) timing in the receiving unit. At this time, a shift by one sample corresponds to a shift of 1/M of a symbol.

The timing detection unit 415 detects the difference between the reference sample number (480 in the present embodiment) and the value of K as a timing error (an example of the correction value for the sampling timing) and outputs the difference. When the timing error from the timing detection unit 415 has a positive value (when K−480>0), the received signal is late relative to the sampling timing in the receiving unit, and therefore, the timing generation unit 416 controls the A/D converter 403 so as to delay the sampling timing. In contrast, when the timing error from the timing detection unit 415 has a negative value (when K−480<0), the received signal is early relative to the sampling timing in the receiving unit, and therefore, the timing generation unit 416 controls the A/D converter 403 so as to make the sampling timing earlier. As a result, it is possible to generate the sampling timing following the received signal.

Though the structure of the present embodiment can be applied to a case where synchronous word signals are arranged at the positions other than the beginning of the wireless frame format (places behind the beginning), for example, it may be applied to a case where the synchronous word signals are arranged at the positions at the beginning of the frame.

As described above, the DSTBC receiving unit in the present embodiment carries out a DSTBC decoding process for each sample so as to carry out a correlation arithmetic operation on the synchronous words (SWs) following the timing synchronization of the receiving unit that adopts the DSTBC method. Thus, in the present embodiment, the synchronization of the symbol timing is followed through the decoding for each sample in the decoding process by the DSTBC method so that excellent signal timing synchronization with high precision can be achieved, and effective communication can be carried out.

Here, in the DSTBC receiving unit in the receiver using the DSTBC method in the present embodiment in FIG. 3, the receiving unit is formed using the functions of the antenna 401 and the reception unit 402, the A/D converting unit is formed using the functions of the A/D converter 403, the downsampling unit is formed using the functions of the downsampler 407, the first DSTBC decoding unit is formed using the functions of the first DSTBC decoding unit 408, the second DSTBC decoding unit is formed using the functions of the second DSTBC decoding unit 411, the synchronous word information storing unit is formed using the functions of the SW table unit 412, the correlation value acquiring unit is formed using the functions of the correlation arithmetic operation unit 413, and the sampling timing control unit is formed using the functions of the maximum value search unit 414, the timing detection unit 415, and the timing generation unit 416.

Third Embodiment

The third embodiment of the present invention is described below. In the present embodiment, a receiver for wireless communication by the STBC method or the DSTBC method is described below. It is also possible to implement a wireless communication system with a receiver having the same characteristics as in the present embodiment or a wireless communication method (receiving method, for example) having the same characteristics as in the present embodiment. Here, digital communication is carried out in the present embodiment. In addition, in the present embodiment, a case where the entirety of the communication frame (including synchronous word signals) is encoded by the STBC method or the DSTBC method on the transmitting side before transmission is shown as the assumption in the first embodiment.

First, the assumption on the transmitting side in the present embodiment is described. The present applicant has proposed a technology according to which signal positions of the synchronous words (SWs) in a DSTBC transmitting unit can be in a fixed pattern in Reference Application 1 (Japanese Patent Application 2010-088918). As a result, the signal positions of the synchronous words after DSTBC encoding, which are not fixed, can be in a fixed pattern, and thus, a problem with the AFC process in a receiving unit that adopts the DSTBC method can be solved, for example. In the timing synchronization following process in the DSTBC receiving unit in the present embodiment, the thus-fixed signal position pattern after DSTBC encoding is used as a reference signal, and the same functions as in the Reference Application 1 are applied to the structure and the operation on the transmitting side (DSTBC transmitting unit). In addition, no differential process is carried out in the STBC method, and therefore, the signal positions of the synchronous words (SWs) in the STBC transmitting unit are in a fixed pattern from the beginning.

Figure 5:
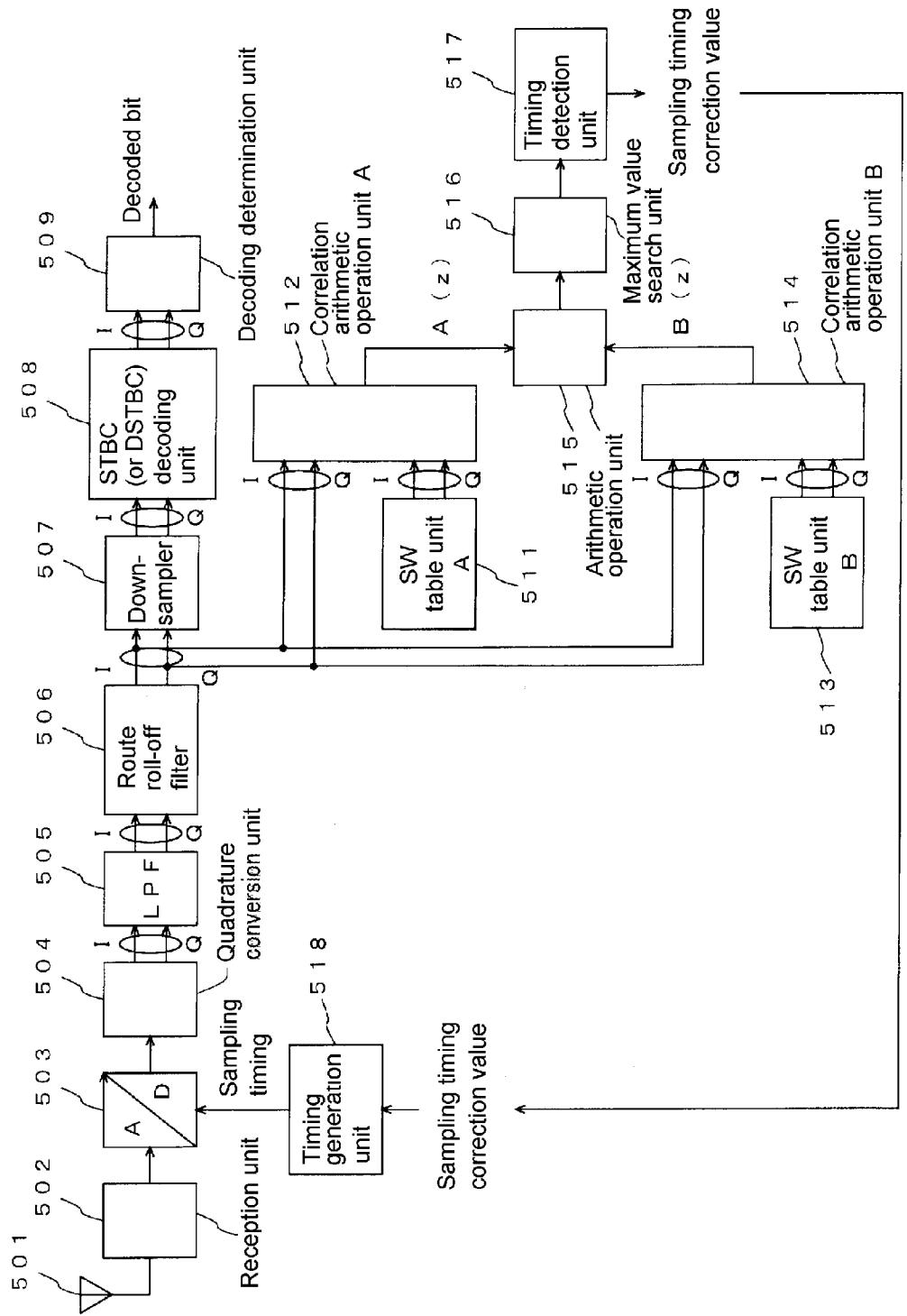
FIG. 5 is a diagram showing an example of the structure of the receiver (STBC receiver or DSTBC receiver) according to one embodiment (third embodiment) of the present invention.

Next, the STBC receiving unit and the DSTBC receiving unit in the present embodiment are described. FIG. 5 shows an example of the structure of a receiving unit (STBC receiving unit or DSTBC receiving unit) provided in a receiver for wireless communication by the STBC method or the DSTBC method according to one embodiment of the present invention. The receiving unit in the present embodiment is provided with an antenna 501 for reception, a reception unit 502, an analog to digital (A/D) converter 503, a quadrature detection unit 504, a low pass filter (LPF) 505, a route roll-off filter 506, a downsampler 507, a decoding unit (STBC decoding unit or DSTBC decoding unit) 508, a decoding determination unit 509, a first SW table unit (SW table unit A) 511, a first correlation arithmetic operation unit (correlation arithmetic operation unit B) 512, a second SW table unit (SW table unit B) 513, a second correlation arithmetic operation unit (correlation arithmetic operation unit B) 514, an arithmetic operation unit 515, a maximum value search unit 516, a timing detection unit 517, and a timing generation unit 518.

In the case where the receiving unit in the present embodiment is applied to the STBC method, a decoding unit in the STBC method (STBC decoding unit) is used as the decoding unit 508 so that information corresponding to the STBC method is stored in the SW table units 511 and 513. In the case where the receiving unit in the present embodiment is applied to the DSTBC method, a decoding unit in the DSTBC method (DSTBC decoding unit) is used as the decoding unit 508 so that information corresponding to the DSTBC method is stored in the SW table units 511 and 513. Other than the above, the structure and the operations of the receiving unit are the same between the STBC method and the DSTBC method, and therefore, they are described together in the present embodiment. Here, an appropriate workshop modification of design due to the difference between the STBC method and the DSTBC method may be provided in addition to those described in the present embodiment.

The antenna 501 receives a signal of modulated waves that has been transmitted wirelessly from the transmitting side (STBC modulated waves or DSTBC modulated waves). The reception unit 502 converts the signal received by the antenna 501 to a signal of a desired intermediate frequency (IF). The A/D converter 503 converts the signal gained by the reception unit 502 from an analog signal to a digital signal. The process hereinafter is a digital signal process.

The quadrature conversion unit 504 converts the frequency of the digital signal gained by the A/D converter 503 (received data of IF) to a base band and outputs components with an in-phase value I and a quadrature value Q. The LPF 505 removes the image component for the IF from the signal gained by and outputted from the quadrature conversion unit 504. The route roll-off filter 506 filters the signal gained by the LPF 505.

The downsampler 507 carries out a thinning process on the signal gained by the route roll-off filter 506. Typically, a thinning process of 1/M is carried out for (number of over-samples)=(sampling frequency)/(transmission symbol rate)=M on the basis of the relationship between the sampling frequency of the A/D converter 503 and the frequency of the transmission symbol rate. Here, symbol points are extracted in the thinning process, and the sample points at which the I pattern in IQ opens the most during one symbol time are selected so that the other points are discarded, for example.

The decoding unit 508 decodes the signal gained by the downsampler 507. In the case where the decoding unit 508 is an STBC decoding unit, the STBC encoding on the transmitting side is decoded so that the estimation value (complex number) of the output from the symbol mapping unit in the STBC transmitting unit is acquired and outputted. In the case where the decoding unit 508 is a DSTBC decoding unit, the differential encoding and the STBC encoding on the transmitting side are both decoded so that the estimation value (complex number) of the output from the symbol mapping unit in the DSTBC transmitting unit is acquired and outputted. In the DSTBC decoding unit, as in the case of the second embodiment (FIG. 3), for example, the operation that can be represented by (formula 1) is carried out on the signal gained by the downsampler 507 once every two symbol times.

The decoding determination unit 509 reconstructs the bit data (estimation of the bit data transmitted from the transmitting side) from the results of the signal decoding by the decoding unit 508 and outputs the resulting bit data.

The first SW table unit 511 holds (stores) signals (I, Q) of the synchronous words (SWs) in the series A after the encoding in the transmitting unit (encoding in the STBC method or encoding in the DSTBC method) in the memory as the signal positions in the series A corresponding to the bit pattern of the synchronous words (SWs) on the transmitting side so as to use the signals as a reference signal for the first correlation arithmetic operation unit 512. In the present embodiment, the symbol length of the synchronous words in the frame is ten symbols, which holds the reference signal positions $a_0$ to $a_9$ (complex numbers) in the series A. Here, the reference signal positions $a_0$ to $a_9$ in the series A correspond to $SW_A$ in FIG. 2(a).

In the STBC receiving unit, the reference signal positions in the series A that correspond to the synchronous words after the STBC encoding in the STBC transmitting unit are set in advance in a table. In the DSTBC receiving unit, the reference signal positions in the series A that correspond to the synchronous words after the DSTBC encoding (differential encoding and STBC encoding) in the DSTBC transmitting unit are set in advance in a table. Here, in the DSTBC transmitting unit in the present embodiment, the pattern of the signal positions after the DSTBC encoding of the synchronous words is fixed, and thus, it is possible to know the pattern in advance.

The first correlation arithmetic operation unit 512 uses the signal r, outputted from the route roll-off filter 506 and the reference signal positions $a_0$ to $a_9$ in the series A outputted from the first SW table unit 511 so as to carry out a correlation arithmetic operation concerning A(z) that can be represented in (formula 5). Here, A(z) is the output (correlation value) from the first correlation arithmetic operation unit 512. In addition, $a_i$ (i=0, 1, 2 . . . 9) is a reference signal position after the synchronous words (SWs) are encoded (STBC encoded or DSTBC encoded) and is stored in the first SW table unit 511.

$$A(z) = \sum_{i=0}^{9} r_{z+M \cdot i} \cdot a_i^* \qquad \text{[Formula 5]}$$

$$B(z) = \sum_{i=0}^{9} r_{z+M \cdot i} \cdot b_i^*$$

The second SW table unit 513 holds (stores) the signals (I, Q) of the synchronous words (SWs) in the series B after the encoding (encoding in the STBC method or encoding in the DSTBC method) in the transmitting unit in a table as the signal positions in the series B corresponding to the bit pattern of the synchronous words (SWs) on the transmitting side and uses the signals as reference signals in the second correlation arithmetic operation unit 514. In the present embodiment, the symbol length of the synchronous words in the frame is 10 symbols, and the table holds the reference signal positions $b_0$ to $b_9$ (complex numbers) in the series B. Here, the reference signal positions $b_0$ to $b_9$ in the series B correspond to $SW_B$ in FIG. 2(a).

In the STBC receiving unit, the reference signal positions in the series B corresponding to the synchronous words after the STBC encoding in the STBC transmitting unit are set in advance in a table. In the DSTBC receiving unit, the reference signal positions in the series B corresponding to the synchronous words after the DSTBC encoding (differential encoding and STBC encoding) in the DSTBC transmitting unit are set in advance in a table. In the DSTBC transmitting unit in the present embodiment, the pattern of the signal positions after the DSTBC encoding of the synchronous words is fixed, and thus, it is possible to know the pattern in advance.

The second correlation arithmetic operation unit 514 uses the signal r, outputted from the route roll-off filter 506 and the reference signal positions $b_0$ to $b_9$ in the series B outputted from the second SW table unit 513 so as to carry out a correlation arithmetic operation concerning B(z) that can be represented in (formula 5). Here, B(z) is the output (correlation value) from the second correlation arithmetic operation unit 514. In addition, $b_i$ (i=0, 1, 2 . . . 9) is the reference signal position after the encoding (STBC encoding or DSTBC encoding) of the synchronous words (SWs) and is stored in the second SW table unit 513.

Here, the transmitting unit in the present embodiment has two types of output series, series A and series B, and therefore, the receiving unit in the present embodiment holds both the table values $a_0$ to $a_9$ corresponding to series A and the table values $b_0$ to $b_9$ corresponding to series B so as to arithmetically operate the correlation values A(z) and B(z) corresponding to the respective series. Here, the table values $a_0$ to $a_9$ corresponding to series A and the table values $b_0$ to $b_9$ corresponding to series B are values that are orthogonal to each other, for example.

The arithmetic operation unit 515 adds up the value $|A(z)|^2$, which is the squared correlation value A(z) in series A gained by the first correlation arithmetic operation unit 512, and the value $|B(z)|^2$, which is the squared correlation value B(z) in series B gained by the second correlation arithmetic operation unit 514 and outputs the results (sum) $|A(z)|^2+|B(z)|^2$ to the maximum value search unit 516. Here, the value gained as the squared correlation value in each series is calculated in the arithmetic operation unit 515 in the present embodiment, but it may be calculated in each correlation arithmetic operation unit 512 or 514 as in another example of the structure. In this case, the arithmetic operation unit 515 is formed of an adder, or a function of calculating the values of the squared correlation values may be provided in other parts.

The maximum value search unit 516 finds in (formula 6) the maximum value $AB_{MAX}$ of the output $|A(z)|^2+|B(z)|^2$ and the sample number K of this maximum value.

$$AB_{MAX} = \max(|A(z)|^2 + |B(z)|^2)$$ [Formula 6]

$$K = \{z \text{ meets the condition for } |A(z)|^2 + |B(z)|^2 = AB_{MAX}\}$$

The timing detection unit 517 calculates the timing error concerning the sampling timing on the basis of the results of the sample number K at the time of the maximum value outputted from the maximum value search unit 516 and outputs the correction value of the sampling timing. The timing generation unit 518 adjusts the sampling timing of the A/D converter 503 on the basis of the correction value (information on the timing error) of the sampling timing outputted from the timing detection unit 517.

An example of the operation of the receiving unit in the present embodiment is described below. The processes carried out between the reception unit 502 and the downsampler 507 on the modulated wave received by the receiving antenna 501 in the present embodiment are the same as in a conventional receiving unit for digital wireless communication, and therefore, the detailed descriptions of the operation are omitted. In the receiving unit in the present embodiment, a symbol is decoded from the downsampled input through the arithmetic operation in the decoding unit 508, and thus, a bit symbol is decoded in the decoding determination unit 509 so as to be outputted.

In general wireless systems, the fact that there is a difference, even slightly, in the internal frequency and the precision of the timing signal due to the difference in the structure of the hardware on the transmitting side and on the receiving side becomes a problem. The former requires an automatic frequency control process and the latter requires a timing synchronization following process so that the precision on the transmitting side is followed on the receiving side. On the receiving side, the internal frequency and the timing precision are adjusted by analyzing the received signal, and the signal positions of the synchronous words (SWs) of which the bit pattern is fixed (already known on the receiving unit side) are used as a reference signal for these processes.

In the receiving unit in the present embodiment, the process block for following the timing synchronization ranges from the SW table unit 511, 513 to the timing generation unit 518. The operation thereof is described below. The first correlation arithmetic operation unit 512 performs calculation in a correlation arithmetic operation for the output from the route roll-off filter 506 and the reference signal in the series A for the synchronous words held by the first SW table unit 511 using (formula 5). Likewise, the second correlation arithmetic operation unit 514 performs calculation in a correlation arithmetic operation for the output from the route roll-off filter 506 and the reference signal in the series B for the synchronous words held by the second SW table unit 513 using (formula 5).

In the present embodiment, a reference signal provides a point at which signals are positioned after the encoding of the synchronous words (SWs), and thus, there are two types of reference signals in series A and series B. Whether the element in series A is stronger, the element in series B is stronger, or the elements in the two series are at the same level in the modulated wave received by the receiving antenna 501 cannot be determined on the receiving unit side without a specific process being carried out, and therefore, both the correlation value A(z) with the synchronous words in series A and the correlation value B(z) with the synchronous words in series B are calculated in the correlation arithmetic operation for following the synchronicity using (formula 5).

The maximum value search unit 516 compares the size of the results (sum) by adding up the squared value of the correlation value A(z) in series A and the squared value of the correlation value B(z) in series B on the basis of the output from the arithmetic operation unit 515, and thus can detect a sample having the signal positions closest to the reference signal in the two series comprehensively. Typically, the maximum value search unit 516 finds $AB_{MAX}$ and K in (formula 6).

Figure 7:
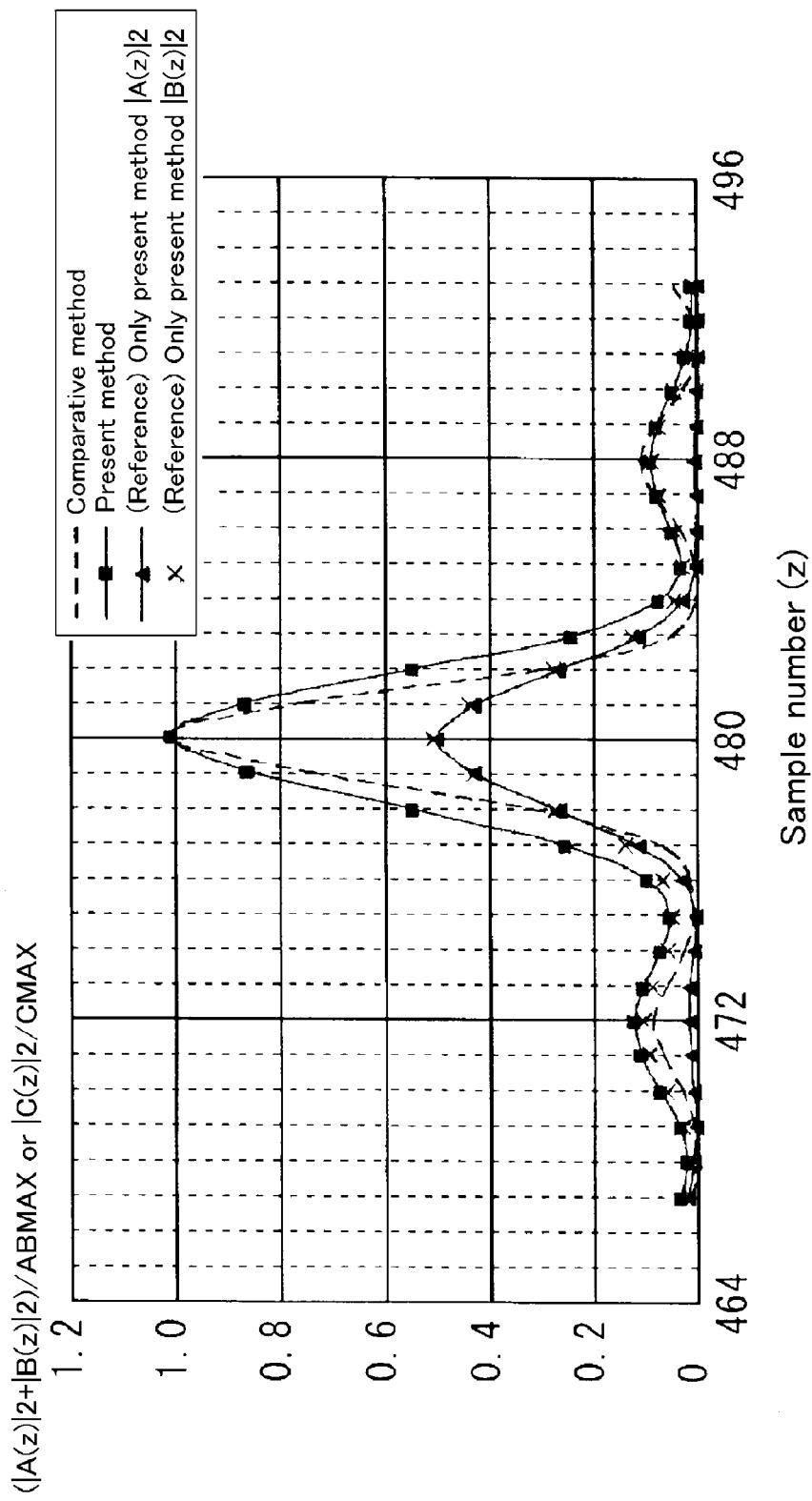
FIG. 7 is a graph showing an example of a simulation calculation of the squared correlation value in the synchronous state following the timing synchronization (Case 3)

An example of the calculation for the squared correlation value in the DSTBC method is shown in reference to FIGS. 6(a), 6(b), and 7. Here, the DSTBC method is shown as an example, but the STBC method is the same. In addition, together with the calculation example in the method (the present method) in the present embodiment, a calculation example for the squared correlation value in the second embodiment (FIG. 3) is also shown as a comparative method. In the present embodiment, M=8, which shows a case where the synchronous words (SWs) start at the $60^{th}$ symbol from the beginning in the frame.

FIG. 6($a$) shows a calculation example for the squared correlation value in the synchronous state following the timing synchronization in the present embodiment, which is an example when the DSTBC received wave is only in series B. FIG. 6($b$) shows a calculation example for the squared correlation value in the synchronous state following the timing synchronization in the present embodiment, which is an example when the DSTBC received wave is only in series A. FIG. 7 shows a calculation example for the squared correlation value in the synchronous state following the timing synchronization in the present embodiment, which is an example when the DSTBC received wave is a synthetic wave in series A and in series B where the power of the two is equal. In the graphs in FIGS. 6($a$), 6($b$), and 7, the lateral axis shows the sample number (z), the longitudinal axis shows $(|A(z)|^2+|B(z)|^2)/AB_{MAX}$ in the present method, and $|C(z)|^2/C_{MAX}$ in the comparative method.

In the state where the received signal and the timing for the process in the receiving unit are completely in sync, as shown in FIGS. 6($a$), 6($b$) and 7, z (=K) that makes $(|A(z)|^2+|B(z)|^2)$ be the maximum value is 8×60=480. Thus, the squared correlation value $((|A(z)|^2+|B(z)|^2)$ in the present embodiment) becomes maximum at a desired timing.

The timing detection unit 517 detects the difference between the reference sample number (480 in the present embodiment) and the value of K as a timing error (an example of the correction value for the sampling timing) and outputs the difference. When the timing error outputted from the timing detection unit 517 has a positive value (when K−480>0), the received signal is behind the sampling timing of the receiving unit, and therefore, the timing generation unit 518 controls the A/D converter 503 so that the sampling timing is late. In contrast, when the timing error outputted from the timing detection unit 517 has a negative value (when K−480<0), the received signal is ahead of the sampling timing of the receiving unit, and therefore, the timing generation unit 518 controls the A/D converter 503 so that the sampling timing is early. As a result, it is possible to generate a sampling timing following the received signal.

Though the structure in the present embodiment is applied to a case where the synchronous word signal is placed in a position other than the beginning of the wireless frame format (portion behind the beginning), it may be applied to a case where the synchronous word signal is placed in the beginning position of the frame.

As described above, in the receiving unit (STBC receiving unit or DSTBC receiving unit) in the present embodiment, a decoding process (STBC decoding process or DSTBC decoding process) is not carried out for each sample (or in other timings) in order to follow the timing synchronization for the receiving unit, but instead a correlation arithmetic operation concerning the synchronous words (SWs) that have been set in advance is carried out so that the amount of the arithmetic operation can be reduced. Thus, the structure in the present embodiment can be used in order to follow the timing synchronization in the demodulation process by the STBC method or the DSTBC method so that effective communication is possible.

In a case where the STBC method is used, for example, the entirety of the frame (including synchronous words) is STBC encoded on the transmitting side, and the synchronous words (in series A, series B) that have been STBC encoded are stored on the receiving side, and thus, a correlation arithmetic operation is carried out so as to control the sampling timing. In another case where the DSTBC method is used, for example, the entirety of the frame (including synchronous words) is DSTBC encoded on the transmitting side, and a constant symbol is used in place of the synchronous words after the DSTBC encoding, and the synchronous words (in series A, series B) that have been replaced with a constant symbol are stored on the receiving side, and thus, a correlation arithmetic operation is carried out so as to control the sampling timing.

In the STBC receiving unit or the DSTBC receiving unit in the receiver using the STBC method or the DSTBC method in the present embodiment in FIG. 5, the receiving unit is formed of the functions of the antenna 501 and the reception unit 502, the A/D converting unit is formed of the functions of the A/D converter 503, the decoding unit is formed of the functions of the decoding unit (STBC decoding unit or DSTBC decoding unit) 508, the synchronous word information storing unit is formed of the functions of the SW table units 511 and 513 in the two series, the correlation value acquiring unit is formed of the functions of the correlation arithmetic operation units 512 and 514 in the two series, and the sampling timing control unit is formed of the functions of the arithmetic operation unit 515, the maximum value search unit 516, the timing detection unit 517, and the timing generation unit 518.

(The following is the descriptions of the contents of Reference Application 1) In the following, the contents of the Reference Application 1 (Japanese Patent Application 2010-088918) are described. These contents may be applied to the present invention if necessary. The contents schematically relate to a technology according to which the signal positions of the synchronous words (SWs) in the DSTBC transmitting unit can be in a fixed pattern. In the examples of the structure in FIGS. 8 and 18, signals in the first series (series A) are transmitted from one base station device 1, 201, and signals in the second series (series B) are transmitted from another base station device 2, 202. Here, the combination of these base station devices and series may be opposite.

Different characters are used in the above descriptions for the embodiments of the present invention and the below descriptions for the contents of the Reference Application 1, and therefore, the correspondence between them is described. (Correspondence 1) x is used for the output signal from the symbol mapping unit in the above descriptions for the embodiments of the present invention, whereas X is used in the below descriptions for the contents of the Reference Application 1. (Correspondence 2) s is used for the output signal from the STBC encoding unit in the above descriptions for the embodiments of the present invention, whereas S is used in the below descriptions for the contents of the Reference Application 1. (Correspondence 3) w (w=0, 1, 2 . . . ) is used for the time series number that changes for each symbol time so that signals with the time series number (symbol number) can be denoted as $x_{w-1}$, $x_w$ and $s_{w-1}$, $s_w$ in the above descriptions for the embodiments of the present invention, whereas m (m=0, 1, 2 . . . ) is used for the time series number that changes for every two symbol times so that signals can be denoted as $X_{2m}$, $X_{2m+1}$ and $S_{2m}$, $S_{2m+1}$ in the below descriptions for the contents of the Reference Application 1. Here, the maximum value of m is half of the maximum value of w. When w is an odd number, each arithmetic operation is carried out, and therefore, the expressions using w and the expressions using m mean substantially the same.

(Description of Transmitting Unit) In one example of the structure in the Reference Application 1, the transmitting unit for transmitting signals by the DSTBC method has the following structure. That is to say, a frame where synchronous words are arranged in predetermined locations behind the beginning is used. In addition, on the basis of the value before the synchronous words and after the beginning of the frame, the initial value control unit sets the initial value for differential encoding when the above-described frame is processed in the DSTBC coder for processing an object to be transmitted so that the signal point that corresponds to the point directly before the synchronous words is a constant point in the DSTBC coder for processing the above-described object to be transmitted.

Accordingly, the signal point that corresponds to the point directly before the synchronous words in the DSTBC coder for processing the object to be transmitted (DSTBC coder in the present embodiment) is made to be a constant point, and thus, the mapping arrangement for the synchronous words can be made a fixed mapping pattern even in the case where the value before the synchronous words and after the beginning of the frame (part of the frame, for example) changes due to the contents of the data to be transmitted so that efficient communication can be achieved by the DSTBC method between the transmitting unit and the receiving unit.

Here, various types of frames can be used for the frame, and an example for use is a frame where data to be transmitted, such as of speech, that can be changed is arranged before the synchronous words and after the beginning. In addition, various types of points made be used as the constant point concerning the fact that the signal point that corresponds to the point directly before the synchronous words (symbol value) becomes a constant point, and such a point is set in advance, for example.

The transmitting unit according to the present embodiment has the following structure, for example. That is to say, in the above-described initial value control unit, the S/P converting unit carries out serial/parallel conversion on the value before the synchronous words and after the beginning of the frame, the symbol mapping unit carries out symbol mapping on the results of the serial/parallel conversion, the differential encoding unit carries out differential encoding on the results of the symbol mapping using a predetermined initial value, and the initial value updating unit updates and sets the initial value for the differential encoding when the above-described frame is processed by the DSTBC coder for processing the above-described object to be transmitted on the basis of the results of the differential encoding.

(Description of the Method for Transmission Corresponding to the Above-Described Transmitting Unit) In one example of the structure in the Reference Application 1, the following process is carried out using the method for transmitting a signal by the DSTBC method. That is to say, a frame where synchronous words are arranged in a predetermined location behind the beginning in used. In addition, serial/parallel conversion is carried out on the value before the synchronous words and after the beginning of the frame, symbol mapping is carried out on the results of the serial/parallel conversion, differential encoding is carried out on the results of the symbol mapping using a predetermined initial value, and a process for updating and setting the initial value for the differential encoding when the above-described frame is processed by the DSTBC coder for processing the object to be transmitted on the basis of the results of the differential encoding is carried out so that the signal point that corresponds to the point directly before the synchronous words becomes a constant point in the DSTBC coder for processing the above-described object to be transmitted.

Accordingly, the signal point that corresponds to the point directly before the synchronous words in the DSTBC coder for processing the object to be transmitted (DSTBC coder in the present embodiment) is made to be a constant point, and thus, the mapping arrangement for the synchronous words can be made a fixed mapping pattern even in the case where the value before the synchronous words and after the beginning of the frame (part of the frame, for example) changes due to the contents of the data to be transmitted so that efficient communication can be achieved by the DSTBC method between the transmitting unit and the receiving unit.

(Description of the Effects) As described above, the structure in the Reference Application 1 achieves efficient communication by the DSTBC method.

Description of the Preferred Embodiments

Figure 17:
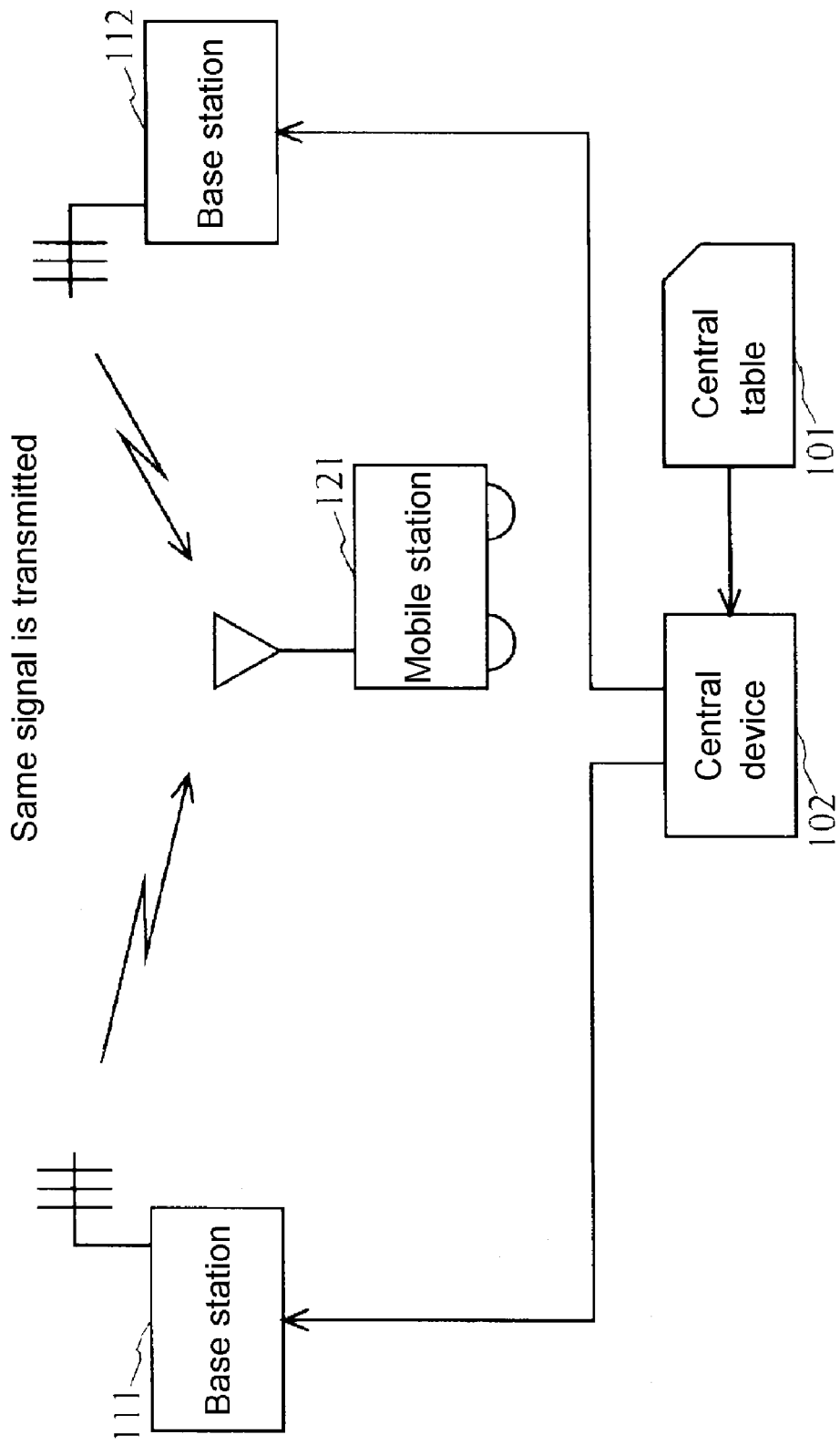
FIG. 17 is a diagram showing an example of the structure of a train wireless system.

The embodiments in the Reference Application 1 are described in reference to the drawings. FIG. 17 shows an example of the structure of a train wireless system, which is an example of a wireless communication system. The train wireless system in the present embodiment is provided with a central table 101, a central device 102, a number of (two are shown) base station devices 111, 112, and a mobile station device 121 in a train.

Here, the central table 101 controls the central device 102. In addition, the central device 102 and the base station devices 111, 112 are connected with wire lines, such as optical fibers, so that digital signals in the bit series of {0, 1} are transmitted between them. Furthermore, the base station devices 111, 112 and the mobile station device 121 are connected through wireless lines. Moreover, a telephone conversation and data communication are made between the central table 101 and the mobile device 121 through the central device 102 and the base station devices 111, 112.

In the case where one wavelength is provided as a wireless frequency and one zone is formed of a number of base station devices 111, 112 as in the train wireless system, for example, the same signal with the same frequency is transmitted from the respective base station devices 111, 112. At this time, the power received by the mobile station device 121 fluctuates depending on the relationship of the phases of the components that reach from the two base station devices 111, 112, and in the worst case where the power of the two waves that have reached is equal and the difference in the phase is 180 degrees, the received signal disappears. This phenomenon is referred to as interference between the same waves.

As a measure to address this problem, the DSTBC method to which a multiple input multiple output (MIMO) technology is applied is provided as a technique for avoiding the interference between the same waves in digital wireless communication.

Figure 18:
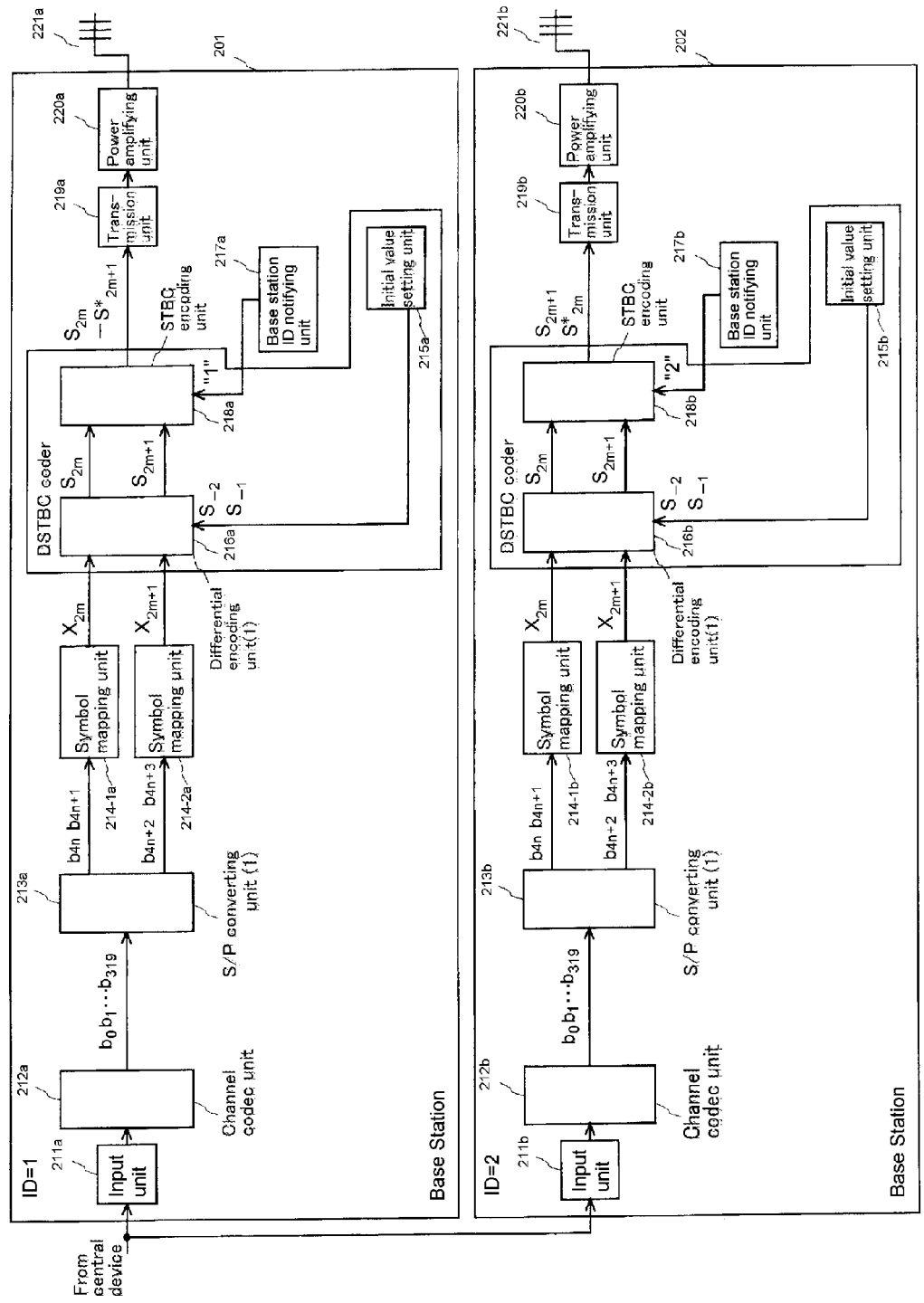
FIG. 18 is a diagram showing an example of the structure of the transmitter in a base station unit using the DSTBC method.

(Description of an Example of the Basic Structure in the Present Embodiment) FIG. 18 shows an example of the structure of the transmitting unit in a base station device using the DSTBC method. In the present embodiment, a case where 4-value digital modulation (2 bit/1 symbol) is used is shown. In the present embodiment, an example of the structure of the transmitting unit in a base station device 201 where the identification information (ID) is 1 and an example of the structure of the transmitting unit in a base station device 202 where the ID is 2 are shown.

The transmitting unit in the first base station device 201 is provided with an input unit 211a, a channel codec unit 212a, a serial/parallel (S/P) converting unit 213a, two symbol mapping units 214-1a, 214-2a, an initial value setting unit 215a, a differential encoding unit 216a, a base station ID notifying unit 217a, an STBC encoding unit 218a, a transmitting unit 219a, a power amplifying unit 220a, and a transmitting antenna 221a. In the present embodiment, the initial value setting unit 215a, the differential encoding unit 216a, and the STBC encoding unit 218a form the DSTBC coder.

The transmitting unit in the second base station device 202 is provided with an input unit 211b, a channel codec unit 212b, a serial/parallel (S/P) converting unit 213b, two symbol mapping units 214-1b, 214-2b, an initial value setting unit 215b, a differential encoding unit 216b, a base station ID notifying unit 217b, an STBC encoding unit 218b, a transmitting unit 219b, a power amplifying unit 220b, and a transmitting antenna 221b. In the present embodiment, the initial value setting unit 215b, the differential encoding unit 216b, and the STBC encoding unit 218b form the DSTBC coder.

An example of the operation of the transmitting unit in the base station devices 201, 202 in the present embodiment is described below. Here, the operation of the transmitting unit in the base station devices 201, 202 is schematically the same, and therefore, the transmitting unit in the first base station device 201 is selected for description, and the different points in the transmitting unit in the second base station device 202 are also described. A digital signal that has been converted from a speech signal or the like transmitted from the central device (speech data) is inputted into the input unit 211a, which outputs the signal to the channel codec unit 212a.

Figure 19:
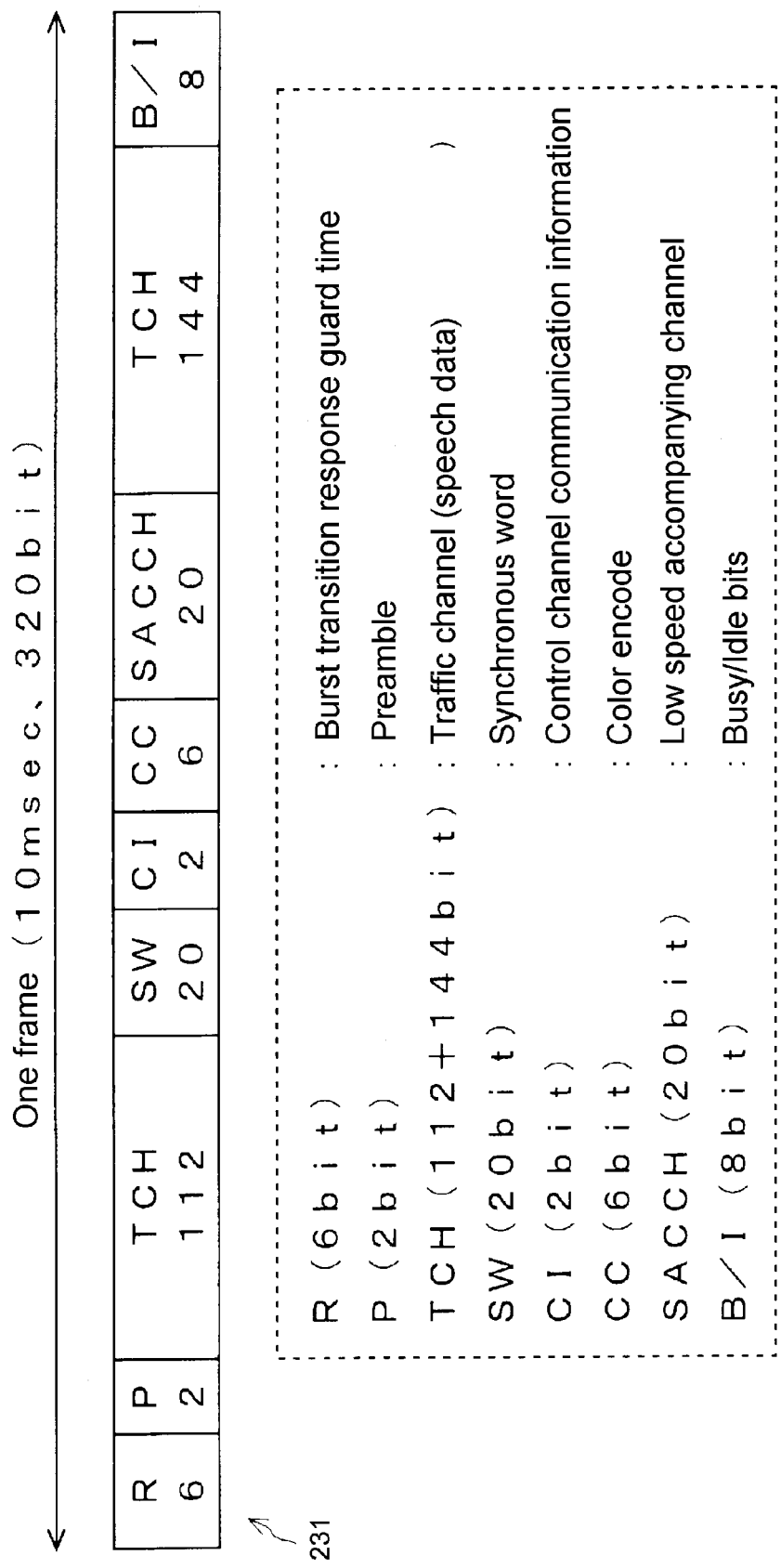
FIG. 19 is a diagram showing an example of the format of the transmission frame.

The channel codec unit 212a generates transmission frame data formed of speech data from the input unit 211a (traffic channel: TCH) and the already known information on the fixed bit value, such as synchronous words (SWs), that are used for the demodulation process on the receiving side (the mobile device side, for example) following the designated frame format and outputs a bit series $\{b_t; t=0, 1, \ldots T-1\}$ of $\{0, 1\}$ to the S/P converting unit 213a. Here, T is a natural number. FIG. 19 shows an example of a format for the transmission frame 231 that is outputted from the channel codec unit 212a. In the present embodiment, T=320.

The S/P converting unit 213a divides the input bit sequence for one frame from the channel codec unit 212a for every two symbols and outputs the resulting sequences to the respective symbol mapping units 214-1a, 214-2a according to the symbol timing. In a typical case where a 4-value digital modulation (2 bit/1 symbol) is used, the input ($b_{4n}$, b, $b_{4n+2}$, $b_{4n+3}$) for 4 bits is divided into two symbols, the first half ($b_{4n}$, $b_{4n+1}$) and the second half ($b_{4n+2}$, $b_{4n+3}$), so that ($b_{4n}$, $b_{4n+1}$) is outputted to the first symbol mapping unit 214-1a according to the first symbol timing and ($b_{4n+2}$, $b_{4n+3}$) is outputted to the second symbol mapping unit 214-2a according to the next symbol timing. Here, n=0, 1 . . . , and T/4−1 is a time series number that changes for every 4 bits.

The first symbol mapping unit 214-1a carries out mapping in accordance with the symbol modulation that has been designated in advance when ($b_{4n}$, $b_{4n+1}$) is inputted from the S/P converting unit 213a and outputs the results $X_{2m}$ to the differential encoding unit 216a. The second symbol mapping unit 214-2a carries out mapping in accordance with the symbol modulation that has been designated in advance when ($b_{4n+2}$, $b_{4n+3}$) is inputted from the S/P converting unit 213a and outputs the results $X_{2m+1}$ to the differential encoding unit 216a.

Figure 20:
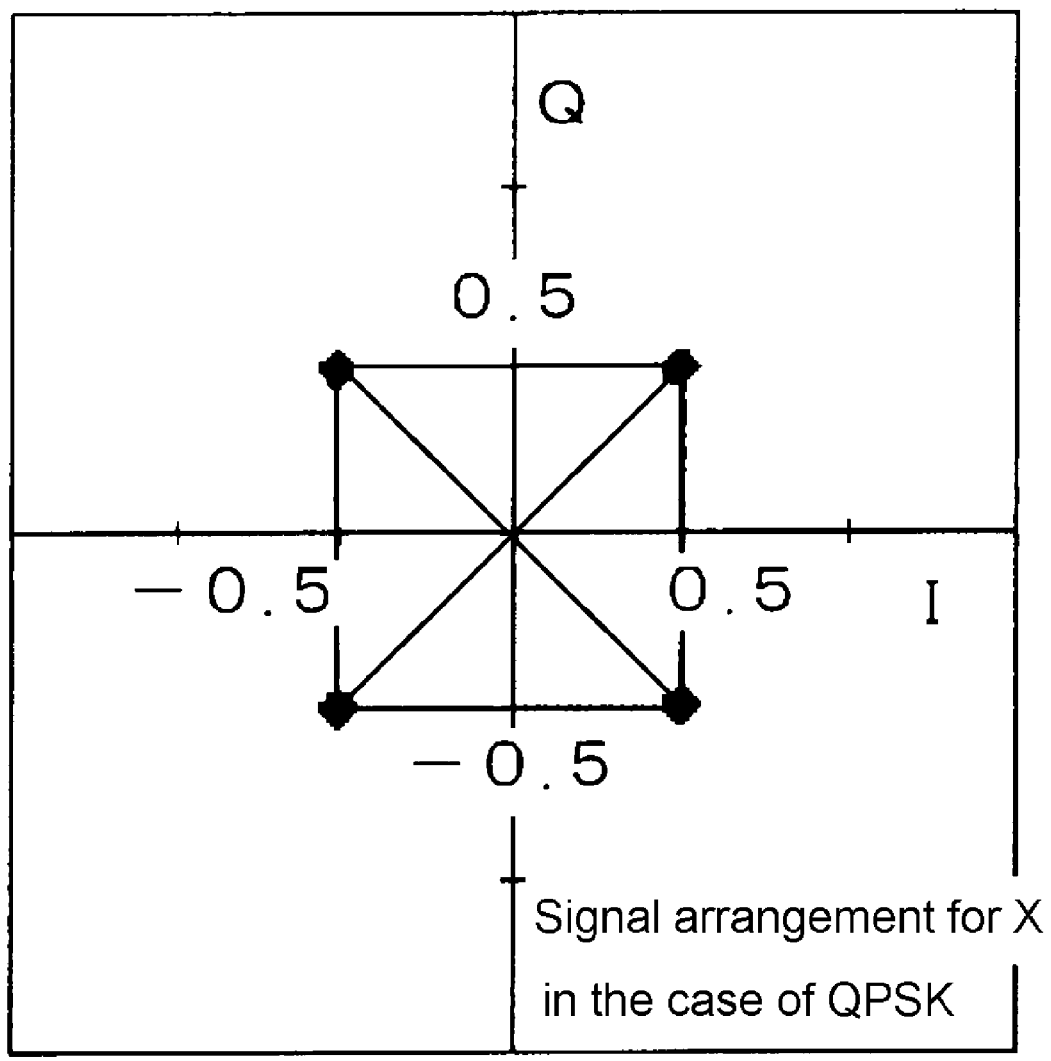
FIG. 20 is a diagram showing an example of the arrangement of signals in QPSK modulation.

In response to the two symbols gained by the division in the S/P converting unit 213a, the two symbol mapping units 214-1a, 214-2a output the symbol modulation $X_{2m}$ for the input of ($b_{4n}$, $b_{4n+1}$), and at the same time output the symbol modulation $X_{2m+1}$ for the input of ($b_{4n+2}$, $b_{4n+3}$). Here, m is a time series number that changes for every two symbols and m=n (m=0, 1 . . . , T/4−1), and $X_{2m}$ and $X_{2m+1}$ are complex numbers. FIG. 20 shows an example of the arrangement of signals X ($X_{2m}$ and $X_{2m+1}$) at the time of quadrature phase shift keying (QPSK) modulation. The lateral axis shows the component in the same phase (I), and the longitudinal axis shows the orthogonal (Q) component.

The differential encoding unit 216a outputs $S_{2m}$ and $S_{2m+1}$ gained through the arithmetic operation in (formula 7) to the STBC encoding unit 218a after $X_{2m}$ and $X_{2m+1}$ have been inputted from the two symbol mapping units 214-1a and 214-2a. Here, * denotes complex conjugates. $S_{2m}$ and $S_{2m+1}$ are complex numbers. The initial value setting unit 215a outputs the initial values $S_{-2}$ and $S_{-1}$ when m=0 to the differential encoding unit 216a so that the setting is complete.

$$\begin{bmatrix} S_{2m} \\ S_{2m+1} \end{bmatrix} = \begin{bmatrix} S_{2m-2} & -S^*_{2m-1} \\ S_{2m-1} & S^*_{2m-2} \end{bmatrix} \begin{bmatrix} X_{2m} \\ X_{2m+1} \end{bmatrix} \qquad \text{[Formula 7]}$$

The base station ID notifying unit 217a outputs the base station ID number to the STBC encoding unit 218a for notification. In the present embodiment, the base station ID notifying unit 217a in the first base station device 201 notifies 1 (ID=1) as the base station ID number of the STBC encoding unit 218a, and the base station ID notifying unit 217b in the second base station device 202 notifies 2 (ID=2) as the base station ID number of the STBC encoding unit 218b.

The STBC encoding unit 218a acquires the values $S_{2m}$, $-S_{2m+i}^*$, $S_{2m+1}$, $S_{2m}^*$ on the basis of the inputs $S_{2m}$ and $S_{2m+1}$ from the differential encoding unit 216a and has a switching function so that the base station ID number notified by the base station ID notifying unit 217a can be distinguished by the switching function, and in accordance with the results, the value selected from among the values on the basis of the inputs $S_{2m}$ and $S_{2m+1}$ from the differential encoding unit 216a is outputted to the transmission unit 219a. In the present embodiment, the switching function of the STBC encoding units 218a, 218b works to distinguish whether the base station ID number is an odd number or an even number, and as a result, $S_{2m}$, $-S_{2m+1}^*$ are outputted to the transmission units 219a, 219b in this order in the case where the base station ID number is an odd number (in the case of the first base station device 201 in the present embodiment), and $S_{2m+1}$, $S_{2m}^*$ are outputted to the transmission units 219a, 219b in this order in the case where the base station ID number is an even number (in the case of the second base station device 202 in the present embodiment).

The transmission unit 219a carries out digital to analog (D/A) conversion and orthogonal modulation processes on the input from the STBC encoding unit 218a so as to modulate the input to a desired wireless transmission frequency and outputs the resulting signal to the power amplifying unit 220a. The power amplifying unit 220a amplifies the output from the transmission unit 219a to the wireless output level and outputs it to the transmitting antenna 221a. The transmitting antenna 221a outputs the signal inputted from the power amplifying unit 220a for wireless transmission.

Though an example of the structure where the STBC encoding units 218a, 218b are provided with the above-described switching function is shown in the present embodiment, it is also possible for the switch having such a switching function to be provided between the STBC encoding units 218a, 218a and the transmission units 219a, 219b (inside or outside the DSTBC coder) in another example of the structure, and in this case, the base station ID notifying units 217a, 217b output the base station ID numbers to the respective switches (not to the STBC encoding units 218a, 218b) for notification, the STBC encoding units 218a, 218b acquire the values $S_{2m}$, $-S_{2m+1}^*$, $S_{2m+1}$, $S_{2m}^*$ on the basis of the inputs $S_{2m}$, $S_{2m+1}$ from the differential encoding units 216a, 216b and output the values to the respective switches, the respective switches distinguish the base station ID numbers notified by the base station ID notifying units 217a, 217b, and in response to the results output the values selected from among the values inputted from the STBC encoding units 218a, 218b to the transmission units 219a, 219b, and the transmission units 219a, 219b process the inputs from the respective switches (instead of the inputs from the STBC encoding units 218a, 218b).

Next, the operations of the symbol mapping units 214-1a, 214-2a and the differential encoding unit 216a are described by citing examples. In the case where the symbol mapping units 214-1a, 214-2a correspond to the QPSK modulation, the outputs thereof X ($X_{2m}$ and $X_{2m+1}$) are shown in (formula 8). Here, j is the imaginary unit.

Input bit When "0 0 ", $X=\frac{1}{2}(1+j)$

Input bit When "0 1 ", $X=\frac{1}{2}(-1+j)$

Input bit When "1 1 ", $X=\frac{1}{2}(-1-j)$

Input bit When "1 0 ", $X=\frac{1}{2}(1-j)$ [Formula 8]

Figure 21:
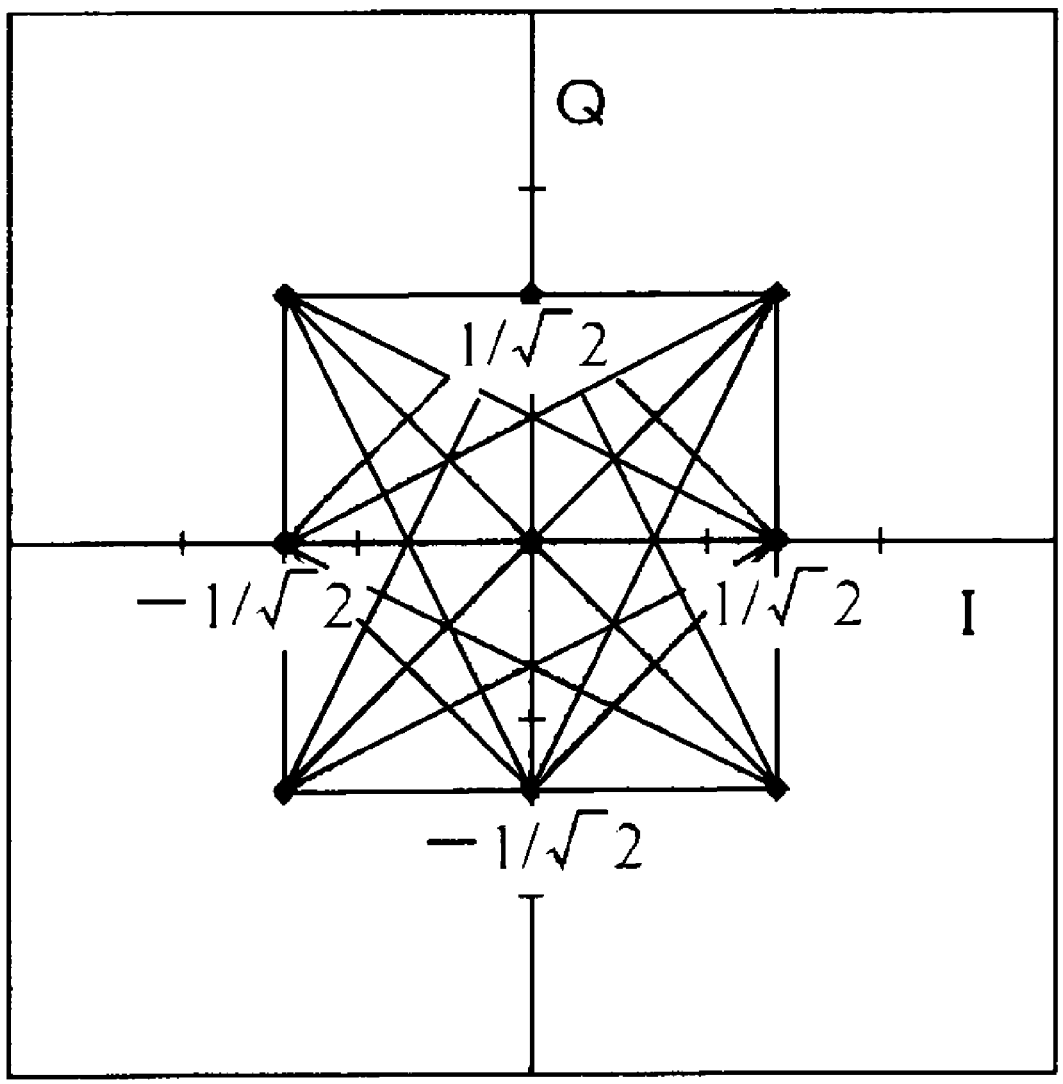
FIG. 21 is a diagram showing an example of the arrangement of signals in DSTBC.

The outputs $S_{2m}$ and $S_{2m+1}$ from the differential encoding unit 216a are calculated using (formula 7). When the outputs $S_{-2}$ and $S_{-1}$ from the initial value setting unit 215a are given in (formula 9), the input bits in the symbol mapping units 214-1a and 214-2a are changed at random, and X ($X_{2m}$ and $X_{2m+1}$) in (formula 8) is substituted in (formula 7) in one example, the arrangement of the output signals from the differential encoding unit 216a becomes that in FIG. 21. FIG. 21 shows an example of the arrangement of DSTBC signals. The lateral axis shows the component in the same phase (I), and the longitudinal axis shows the orthogonal (Q) component.

$$\begin{bmatrix} S_{-2} \\ S_{-1} \end{bmatrix} = \frac{1}{\sqrt{2}} \begin{bmatrix} 1 \\ 1 \end{bmatrix}$$ [Formula 9]

When the outputs $S_{-2}$ and $S_{-1}$ from the initial value setting unit 215a are given in (formula 10), the input bits in the symbol mapping units 214-1a and 214-2a are changed at random, and X ($X_{2m}$ and $X_{2m+1}$) in (formula 8) is substituted in (formula 7) in another example, the arrangement of the output signals from the differential encoding unit 216a becomes that in FIG. 22. FIG. 22 shows an example of the arrangement of DSTBC signals where the coordinates S of the twenty points thereof are shown with a number (mapping point number) being attached to each symbol value. The lateral axis shows the component in the same phase (I), and the longitudinal axis shows the orthogonal (Q) component.

$$\begin{bmatrix} S_{-2} \\ S_{-1} \end{bmatrix} = \frac{1}{\sqrt{6}} \begin{bmatrix} 1 \\ 2+j \end{bmatrix}$$ [Formula 10]

Typically, the numbers [1] to [20] are attached to the twenty output points in the mapping arrangement in FIG. 22. As a result of the calculation using (formula 7), it is confirmed that the combinations of $S_{2m}$ and $S_{2m+1}$ have 24 states as shown in the table in FIG. 23. The table in FIG. 23 shows a combination of the signal arrangement of $S_{2m}$ and $S_{2m+1}$ when the initial values are those in (formula 10) and an example of the state number corresponding to this combination.

When the signal arrangement in FIG. 21 and the signal arrangement in FIG. 22 are compared, it can be confirmed that the points shift from each other from among the same twenty points in FIG. 22 as long as the initial value is any of the state numbers in FIG. 23, though the mapping scores and the arrangement points for S are different depending on the selection of the initial value.

In addition, (formula 7) shows that the mapping of the outputs in the DSTBC method ($S_{2m}$ and $S_{2m+1}$) depends on the outputs of the timing before that ($S_{2m-2}$ and $S_{2m-1}$) (or depends on the initial values ($S_{-2}$ and $S_{-1}$) in the case of m=0). This shows that even when the inputs of the symbol mapping units 214-1a, 214-2a are in an already-known fixed bit pattern, such as the synchronous words, and the arrangements and the shifting of X are fixed, its DSTBC mapping arrangement changes depending on the output mapping arrangement directly before, that is to say, the bit pattern of the speech data input before the synchronous words (SWs).

In the case of a general digital wireless system, an algorithm is adopted for a functioning unit for a decoding process mounted in a mobile station device (mobile station device 121 in FIG. 17, for example) under the assumption that the mapping arrangement of the synchronous words is already known. In the algorithm, for example, in an automatic frequency control (AFC) process, the phase error between the results of the demodulation demapping arrangement of the synchronous words and the already-known mapping arrangement of the synchronous words is calculated so that the received frequency is corrected.

In the modulation process using the DSTBC method, however, the mapping arrangement of the synchronous words changes depending on the speech data input directly before as described above, and therefore, such a problem arises that a measurement is required when an AFC process is carried out on the receiving side, for example, because the mapping arrangement points for reference become inconsistent.

Embodiment

Figure 8:
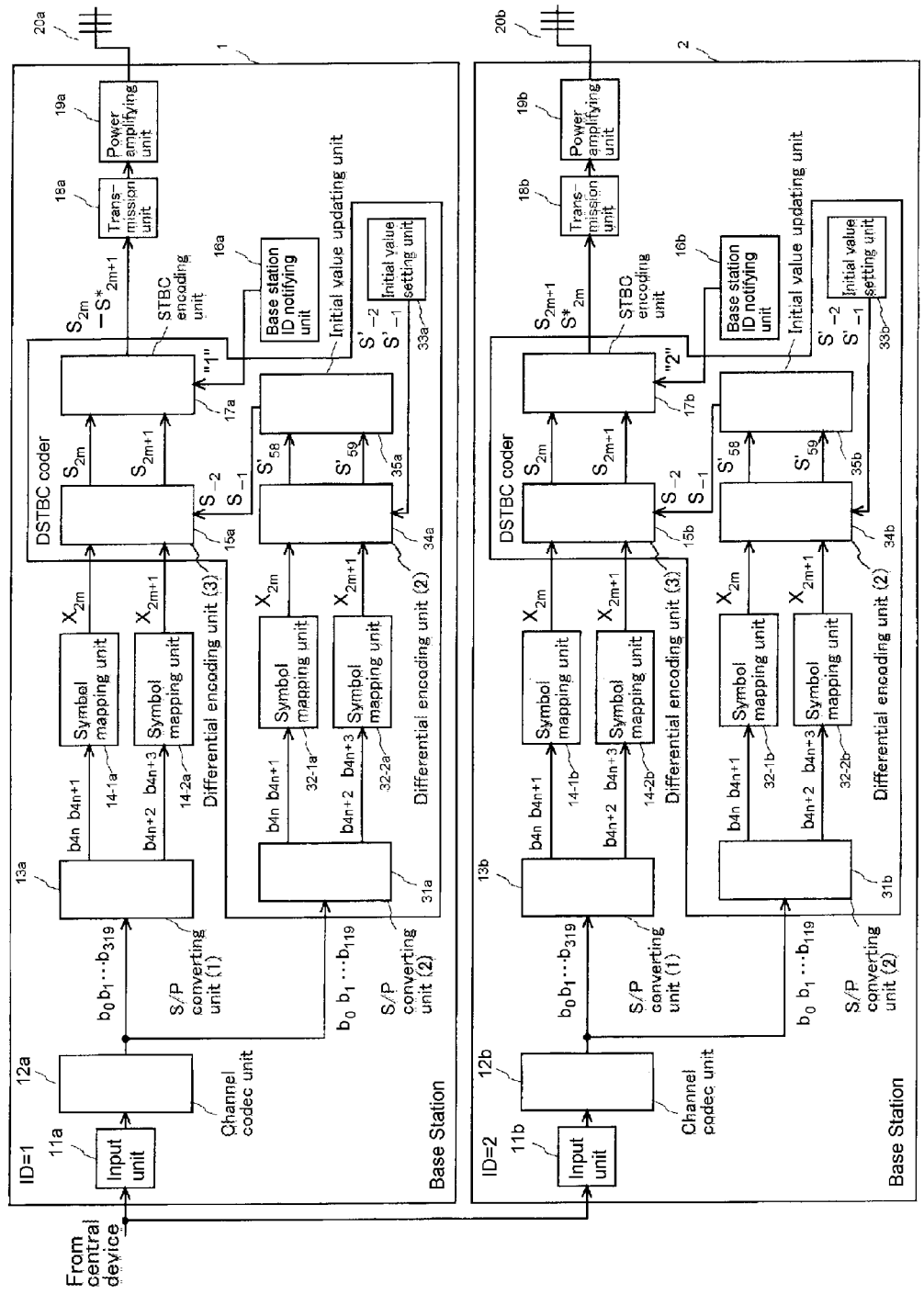
FIG. 8 is a diagram showing an example of the structure of the transmitter in the base station unit using the DSTBC method according to one embodiment in Reference Application 1.

FIG. 8 shows an example of the structure of the transmitting unit in a base station device using the DSTBC method according to one embodiment of the Reference Application 1. In the present embodiment, a case where 4-value digital modulation (2 bits/1 symbol) is used is shown. In the present embodiment, an example of the structure of the transmitting unit in the base station device 1 of which the identification information (ID) is 1 and an example of the structure of the transmitting unit in the base station device 2 of which the ID is 2 are shown.

The transmitting unit in the first base station device 1 is provided with an input unit 11a, a channel codec unit 12a, a serial/parallel (S/P) converting unit 13a, two symbol mapping units 14-1a, 14-2a, a differential encoding unit 15a, a base station ID notifying unit 16a, an STBC encoding unit 17a, a transmission unit 18a, a power amplifying unit 19a, and a transmitting antenna 20a in addition to an S/P converting unit 31a, two symbol mapping units 32-1a, 32-2a, an initial value setting unit 33a, a differential encoding unit 34a, and an initial value updating unit 35a. In the present embodiment, the differential encoding unit 15a, the STBC encoding unit 17a, the S/P converting unit 31a, the two symbol mapping units 32-1a, 32-2a, the initial value setting unit 33a, the differential encoding unit 34a, and the initial value updating unit 35a form a DSTBC coder.

The transmitting unit in the second base station device 2 is provided with an input unit 11b, a channel codec unit 12b, a serial/parallel (S/P) converting unit 13b, two symbol mapping units 14-1b, 14-2b, a differential encoding unit 15b, a base station ID notifying unit 16b, an STBC encoding unit 17b, a transmission unit 18b, a power amplifying unit 19b, and a transmitting antenna 20b in addition to an S/P converting unit 31b, two symbol mapping units 32-1b, 32-2b, an initial value setting unit 33b, a differential encoding unit 34b, and an initial value updating unit 35b. In the present embodiment, the differential encoding unit 15b, the STBC encoding unit 17b, the S/P converting unit 31b, the two symbol mapping units 32-1b, 32-2b, the initial value setting unit 33b, the differential encoding unit 34b, and the initial value updating unit 35b form a DSTBC coder.

An example of the operation in the transmitting units in the base station devices 1 and 2 in the present embodiment is described below. Here, the operation of the transmitting units in the respective base station devices 1 and 2 is approximately the same, and therefore, the transmitting unit in the first base station device 1 is selected for description. In addition, the description in the present embodiment focuses on the differences in the structure and the operation from the transmitting units in the base station devices 201 and 202 in FIG. 18, and thus, the detailed descriptions for the same parts are not repeated. Furthermore, it is assumed in the present embodiment that the transmission frame format generated in the channel codec units 12a and 12b follows that shown in FIG. 19.

First, the structures and the operations of the input unit 11a, the channel codec unit 12a, the S/P converting unit 13a, the two symbol mapping units 14-1a, 14-2a, the differential encoding unit 15a, the base station ID notifying unit 16a, the STBC encoding unit 17a, the transmission unit 18a, the power amplifying unit 19a, and the transmitting antenna 20a are approximately the same as those of the corresponding processing units in FIG. 18, respectively. These in the present embodiment are different from those in FIG. 18 in that the channel codec unit 12a generates one transmission frame following the frame format and outputs the bit series of {0, 1} {$b_t$: t=0, 1 ... T} (T=319 in the present embodiment) not only to the S/P converting unit 13a, but also to the S/P converting unit 31a, and in that the initial values $S_{-2}$ and $S_{-1}$ inputted into the differential encoding unit 15a are outputted from the initial value updating unit 35a.

Next, the S/P converting unit 31a, the two symbol mapping units 32-1a and 32-2a, the initial value setting unit 33a, the differential encoding unit 34a, and the initial value updating unit 35a by which the present embodiment is mainly characterized are described. Though the main functions of the S/P converting unit 31a are the same as those of the S/P converting unit 13a, the number of input bits is for one transmission frame (320 bits) in the S/P converting unit 13a, while the number of input bits is 120 bits from the beginning to the bit directly before the synchronous words in the S/P converting unit 31a (R, P, TCH in FIG. 19). In addition, the S/P converting unit 13a outputs in sync with the symbol timing, while the S/P converting unit 31a sequentially divides the symbols and outputs after the below-described process has been completed.

Typically, the S/P converting unit 31a takes 120 bits from the beginning and before the synchronous words within the one transmission frame from the channel codec unit 12a, and after that divides the input for 4 bits ($b_{4n}$, $b_{4n+1}$, $b_{4n+2}$, $b_{4n+3}$) in this input bit sequence for 120 bits into two symbols (2 bits/1 symbol in the present embodiment), the first half ($b_{4n}$, $b_{4n+1}$) and the second half ($b_{4n+2}$, $b_{4n+3}$), outputs the first ($b_{4n}$, $b_{4n+1}$) to the first symbol mapping unit 32-1a, and outputs the next ($b_{4n+2}$, $b_{4n+3}$) to the second symbol mapping unit 32-2a.

The main functions of the respective symbol mapping units 32-1a and 32-2a are the same as those of the respective symbol mapping units 14-1a and 14-2a. Typically, ($b_{4n}$, $b_{4n}$) is inputted from the S/P converting unit 31a to the first symbol mapping unit 32-1a, which then carries out the mapping following the symbol modulation that has been designated in advance, and outputs the result $X_{2m}$ to the differential encoding unit 34a. In addition, ($b_{4n+2}$, $b_{4n+3}$) is inputted from the S/P converting unit 31a to the second symbol mapping unit 32-2a, which then carries out the mapping following the symbol modulation that has been designated in advance, and outputs the result $X_{2m+1}$ to the different encoding unit 34a. Thus, the symbol mapping units 32-1a and 32-2a sequentially modulate the inputs to $X_{2m}$ and $X_{2m+1}$.

After $X_{2m}$ and $X_{2m+1}$ have been inputted from the two symbol mapping units 32-1a and 32-2a, the differential encoding unit 34a carries out an arithmetic operation in (formula 11) so as to sequentially calculate $S'_{2m}$ and $S'_{2m+1}$ and outputs the values $S'_{58}$ and $S'_{59}$ (the last two values for the 120 bits), which are gained from the calculation when m=29, to the initial value updating unit 35a. The initial value setting unit 33a outputs for setting the values in (formula 12) to the differential encoding unit 34a as the initial values $S'_{-2}$ and $S'_{-1}$ when m=0.

$$\begin{bmatrix} S'_{2m} \\ S'_{2m+1} \end{bmatrix} = \begin{bmatrix} S'_{2m-2} & -S'^{*}_{2m-1} \\ S'_{2m-1} & S'^{*}_{2m-2} \end{bmatrix} \begin{bmatrix} X_{2m} \\ X_{2m+1} \end{bmatrix} \quad \text{[Formula 11]}$$

$$\begin{bmatrix} S'_{-2} \\ S'_{-1} \end{bmatrix} = \frac{1}{\sqrt{6}} \begin{bmatrix} 1 \\ 2+j \end{bmatrix} \quad \text{[Formula 12]}$$

The initial value updating unit 35a finds the initial values $S_{-2}$ and $S_{-1}$ of the differential encoding unit 15a from the outputs $S'_{58}$ and $S'_{59}$ from the differential encoding unit 34a and outputs them to the differential encoding unit 15a. In another example of the structure, the differential encoding unit 34a outputs the state numbers corresponding to the values $S'_{58}$ and $S'_{59}$ to the initial value updating unit 35a so that the initial value updating unit 35a finds the initial values $S_{-2}$ and $S_{-1}$ of the differential encoding unit 15a from the state numbers of the differential encoding unit 34a. Here, the differential encoding unit 15a calculates (formula 7) in the same manner as in FIG. 18 using the initial values $S_{-2}$ and $S_{-1}$ given by the initial value updating unit 35a in the present embodiment.

Next, the process that is carried out in the initial value updating unit 35a is described in detail. In the present embodiment, the initial value updating unit 35a finds the initial values $S_{-2}$ and $S_{-1}$ of the differential encoding unit 15a from the outputs $S'_{58}$ and $S'_{59}$ (or state numbers) from the differential encoding unit 34a following the contents of the table (conversion table) in FIG. 9 and outputs them to the differential encoding unit 15a.

Figure 9:
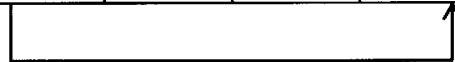
FIG. 9 is a table showing an example of conversion from input to output in an initial value updating unit.

FIG. 9 shows an example of the conversion table from the input to the output of the initial value updating unit 35a. Typically, a list of the output values $S'_{58}$ and $S'_{59}$ directly before the synchronous words from the differential encoding unit 34a in the front stage and the state numbers corresponding to them (information on the inputs of the initial value updating unit 35a) is shown, which has the same contents as in FIG. 23, and a list of the initial values $S_{-2}$ and $S_{-1}$ of the differential encoding unit 15a in the rear stage and the state numbers corresponding to them (information on the outputs of the initial value updating unit 35a) is also shown. In addition, when the state numbers of the inputs are determined in the initial value updating unit 35a, the state numbers of the inputs (state numbers in the same row in the conversion table in FIG. 9) are outputted. Here, the mapping dot numbers [1] to [20] denote the same symbol values as in FIG. 22.

In the present embodiment, the units from the S/P converting unit 31a to the initial value updating unit 35a process 120 bits from the beginning of the frame so as to find the initial values $S_{-2}$ and $S_{-1}$, and after that starts the process in the processing units following the S/P converting unit 13a (the units from the S/P converting unit 13a to the STBC encoding unit 17a, for example) so that $X_{2m}$ and $X_{2m+1}$ are sequentially found in the symbol mapping units 14-1a, 14-2a and $S_{2m}$ and $S_{2m+1}$ are sequentially calculated in the differential encoding unit 15a, and thus, 320 bits from the beginning of the frame are processed. In this case, $S_0$ and $S_1$ when m=0 are calculated using the initial values $S_{-2}$ and $S_{-1}$.

When the differential encoding unit 15a calculates (formula 7) using the initial values $S_{-2}$ and $S_{-1}$ in the present embodiment, the state number of the results of the calculation when m=29, that is to say, the combination of $S_{58}$ and $S_{59}$ directly before the synchronous words, is inevitably 1, and thus, the mapping arrangement of the synchronous words $S_{2m}$ and $S_{2m+1}$ of the synchronous words (m=30 to 34) can be in the fixed mapping pattern corresponding to the fixed bit pattern.

(Description of an Example of the First Simulation) FIG. 10 shows an example of the simulation results (Case 1-1). In this case, the combination of $S'_{58}$ and $S'_{59}$ corresponds to the state number 4, and therefore, the initial values $S_{-2}$ and $S_{-1}$ corresponding to the state number 12 are used on the basis of the conversion table in FIG. 9. FIG. 11 shows an example of the simulation results (Case 1-2). In this case, the combination of $S'_{58}$ and $S'_{59}$ corresponds to the state number 24, and therefore, the initial values $S_{-2}$ and $S_{-1}$ corresponding to the state number 20 are used on the basis of the conversion table in FIG. 9.

Here, in the simulation in the present embodiment, the inputs up to the synchronous words are random bit inputs and the synchronous words are in a fixed pattern. In addition, FIGS. 10 and 11 show the shift of $S_{2m}$ and $S_{2m+1}$ following the input pattern and the shift of $S'_{2m}$ and $S'_{2m+1}$ as the shift of the state numbers. The bit pattern of the 120 bits in the random bit input is different between the results in FIG. 10 and the results in FIG. 11, but it is shown that the state number directly before the synchronous words is 1 and the mapping pattern of the synchronous words is a fixed mapping pattern. Here, cases where the input data is in another input pattern have been tested, and the same results were gained.

(Description of an Example of the Second Simulation) FIGS. 12 to 16 are referred to for the description. First, the points where the structure and the operation of the transmitting unit in the second simulation are different from the above-described contents are described in reference to FIG. 8. Though the main functions of the symbol mapping units 14-1a, 14-2a, 32-1a, 32-2a in the second simulation are the same as in the above description, different symbol modulations are defined for the first outputs ($b_{4n}$, $b_{4n+1}$) and the second outputs ($b_{4n+2}$, $b_{4n+3}$) from the S/P converting units 13a, 31a, respectively, in the second simulation.

The first outputs ($b_{4n}$, $b_{4n+1}$) are respectively inputted from the S/P converting units 13a, 31a in the front stage to the symbol mapping units 14-1a, 32-1a, which work as the first symbol mapping unit (symbol mapping unit A), and an arithmetic operation for $X_{2m}$ given in (formula 13), which is the same as in (formula 8), is carried out, and the results are outputted to the differential encoding units 15a, 34a in the rear stage. The second outputs ($b_{4n+2}$, $b_{4n+3}$) are respectively inputted from the S/P converting units 13a, 31a in the front stage to the symbol mapping units 14-2a, 32-2a, which work as the second symbol mapping unit (symbol mapping unit B), and an arithmetic operation for $X_{2m+1}$ given in (formula 14) is carried out, and the results are outputted to the differential encoding units 15a, 34a in the rear stage. Here, (formula 14) is gained by rotating (formula 13) by −45° in the IQ plane.

$$\text{Input bit When "0 0"}, X_{2m} = \frac{1}{2}(1 + j) \qquad \text{[Formula 13]}$$

$$\text{Input bit When "0 1"}, X_{2m} = \frac{1}{2}(-1 + j)$$

$$\text{Input bit When "1 1"}, X_{2m} = \frac{1}{2}(-1 - j)$$

$$\text{Input bit When "1 0"}, X_{2m} = \frac{1}{2}(1 - j)$$

$$\text{Input bit When "0 0"}, X_{2m+1} = \frac{1}{\sqrt{2}} \qquad \text{[Formula 14]}$$

$$\text{Input bit When "0 1"}, X_{2m+1} = j\frac{1}{\sqrt{2}}$$

$$\text{Input bit When "1 1"}, X_{2m+1} = -\frac{1}{\sqrt{2}}$$

$$\text{Input bit When "1 0"}, X_{2m+1} = -j\frac{1}{\sqrt{2}}$$

Furthermore, when (formula 11) is calculated using the initial values $S'_{-2}$ and $S'_{-1}$ in (formula 15) for the symbol mapping units 32-1a, 32-2a, the initial value setting unit 33a, and the differential encoding unit 34a that are used as examples, the output signals from the differential encoding unit 34a are arranged as in FIG. 12, which is a signal arrangement without the original point. FIG. 12 shows an example of the signal arrangement in the differential encoding unit 34a where the coordinate S is shown for the 24 points therein, and numbers (mapping dot numbers) are attached to the respective symbol values. The lateral axis shows the component in the same phase (I) and the longitudinal axis shows the orthogonal component (Q).

$$\begin{bmatrix} S'_{-2} \\ S'_{-1} \end{bmatrix} = \frac{1}{\sqrt{2}} \begin{bmatrix} 1 \\ 1 \end{bmatrix} \qquad \text{[Formula 15]}$$

Typically, the numbers [1] to [24] are attached to the 24 output points in the mapping arrangement in FIG. 12. It is confirmed from the results of calculation in (formula 11) that the combinations of $S'_{2m}$ and $S'_{2m+1}$ can be in any of the 24 states of combinations as in the table in FIG. 13. The table in FIG. 13 shows an example of the signal arrangement for the combinations of $S'_m$ and $S'_{2m+1}$ (same for $S_{2m}$ and $S_{2m+1}$) in the second simulation and the state numbers corresponding to them. Here, it is confirmed that the signal shifts from among the same 24 points as in FIG. 12 when the initial value is any of the state numbers in FIG. 13.

When this is applied to the symbol mapping units 14-1a, 14-2a, the differential encoding unit 15a, and the STBC encoding unit 17a, the output signals from the differential encoding unit 15a are arranged as in FIG. 12, which is a signal arrangement without the original point, and the signal outputs from the STBC encoding unit 17a in the rear stage are also arranged in the same manner, which is a signal arrangement without the original point.

Thus, the transmitting unit in the second simulation is provided with the symbol mapping units 14-1a, 14-2a for carrying out a symbol modulation where the arrangement of the output signals from the STBC encoding unit 17a does not include the original point (0 point). In addition, the input to the DSTBC coder is found through a predetermined arithmetic operation so that it can be implemented that the original point in the signal arrangement does not include a symbol in the DSTBC coder, and thus, the original point is not included in the signal arrangement so that the fluctuation in the amplitude of the envelope curve of the transmission waveform can be reduced, for example, and as a result, the requirement for the performance of the power amplifying unit 19a can be reduced.

Next, the process carried out by the initial value updating unit 35a is described in detail.

In the transmitting unit in the second simulation, the initial value updating unit 35a finds the initial values $S_{-2}$ and $S_{-1}$ of the differential encoding unit 15a from the outputs $S'_{58}$ and $S'_{59}$ (or the state numbers) of the differential encoding unit 34a following the contents in the table (conversion table) in FIG. 1 and outputs them to the differential encoding unit 15a.

Figure 14:
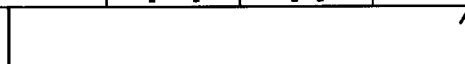
FIG. 14 is a table showing an example of conversion from input to output in the initial value updating unit in the second simulation.

FIG. 14 shows an example of the conversion table from the input to the initial value updating unit 35a to the output. Typically, a list of output values $S'_{58}$ and $S'_{59}$ from the differential encoding unit 34a in the front stage directly before the synchronous words and the state numbers corresponding to these (information on the inputs to the initial value updating unit 35a) is shown, which has the same contents as in FIG. 13, and a list of the initial values $S_{-2}$ and $S_{-1}$ of the differential encoding unit 15a in the rear stage and the state numbers corresponding to them (information on the outputs from the initial value updating unit 35a) is also shown. When the state number of the input is determined in the initial value updating unit 35a, the state number corresponding to this (state number in the same row in the conversion table in FIG. 14) is outputted. Here, the mapping dot numbers [1] to [24] indicate the same symbol values as in FIG. 12.

When the differential encoding unit 15a calculates (formula 7) using the initial values $S_{-2}$ and $S_{-1}$ as in the present embodiment, the state number of the results of calculation when m=29, that is to say, the combination of $S_{58}$ and $S_{59}$ directly before the synchronous words, is inevitably 1, and thus, the mapping arrangement of $S_{2m}$ and $S_{2m+1}$ (m=30 to 34) of the synchronous words can be in the fixed mapping pattern corresponding to the fixed bit pattern.

FIG. 15 shows an example of the simulation results (Case 2-1). In this case, the combination of $S'_{58}$ and $S'_{59}$ corresponds to the state number 16, and therefore, the initial values $S_{-2}$ and $S_{-1}$ corresponding to the state number 20 are used on the basis of the conversion table in FIG. 14. FIG. 16 shows an example of the simulation results (Case 2-2). In this case, the combination of $S'_{58}$ and $S'_{59}$ corresponds to the state number 23, and therefore, the initial values $S_{-2}$ and $S_{-1}$ corresponding to the state number 19 are used on the basis of the conversion table in FIG. 14.

Here, in the second simulation, the inputs up to the synchronous words are random bit inputs and the synchronous words are in a fixed pattern. In addition, FIGS. 15 and 16 show the shift of $S_{2m}$ and $S_{2m+1}$ following the input pattern and the shift of $S'_{2m}$ and $S'_{2m+1}$ as the shift of the state numbers. The bit pattern for the 120 bits of the random bit input is different between the results of FIGS. 15 and 16, which show that the state number directly before the synchronous words is 1 and the mapping pattern of the synchronous words is a fixed mapping pattern. Here, other cases where other input patterns are used as the input data have been tested, and the same results were gained.

(Outline of the Embodiments in Reference Application 1)

As described above, the initial values $S_{-2}$ and $S_{-1}$ for differential encoding when the values in the frame from the beginning to the one before the synchronous words (bit values, for example) are processed are set on the basis of the above-described values (values in the frame) in the transmitting unit using the DSTBC method in the present embodiments so that the signal point corresponding to the point directly before the synchronous words is a constant point in the processes in the present embodiment (processes between the S/P converting unit 13a and the STBC encoding unit 17a) in the case where the synchronous words are arranged in predetermined locations behind the beginning of the frame.

The AFC process for digital wireless communication is usually carried out under the assumption that the mapping arrangement for the synchronous words is already known, and therefore, an error as compared to the mapping arrangement resulting from the demodulation of the synchronous words is arithmetically operated for correction on the receiving side. When a conventional DSTBC method is used, however, the mapping arrangement changes depending on the input of the data directly before (speech data, for example), and therefore, the mapping arrangement for reference becomes inconsistent, which makes it necessary to take measures. Thus, in the present embodiment, the initial values $S_{-2}$ and $S_{-1}$ to be inputted to the differential encoding unit 15a are found from the data of 120 bits ranging from the beginning of the frame of the received data to the bit directly before the synchronous words through an arithmetic operation so that the results of the arithmetic operation are set as the initial value, and as a result, it is possible to compare the mapping arrangement of the synchronous words with the reference mapping pattern as a fixed mapping pattern.

Thus, in the present embodiment, a mapping pattern (mapping arrangement) of the synchronous words, which has been inconsistent depending on other input data according to the prior art, is a fixed mapping pattern (already-known fixed arrangement, for example) in a radio using the DSTBC method, and therefore, it is possible to define in advance the mapping arrangement points that become reference for the AFC process on the receiving side, for example.

Here, a train wireless system that is a simultaneously transmitting wireless system (system as in FIG. 17, for example) is schematically described as an example of the wireless communication system to which the structure of the present embodiment can be applied. In the train wireless system, a number of base station devices are installed along a railway, for example, so that one central device delivers (transmits) a data sequence S to be transmitted simultaneously to the respective base station devices, and each base station device wirelessly transmits the signal of the data sequence generated from this data sequence S from the antenna. In addition, the mobile station device in a train running along the railway receives the wireless signal (radio wave) from the base station devices. Here, each base station device is provided with two directional antennas having different wireless communication regions (may have an overlapping portion).

Radio waves interfere in an area where the communication areas (wireless communication regions) of adjacent base station devices overlap when such a system is managed for a number of base station devices using the same frequency according to the prior art. Therefore, it is possible to provide an example of the structure where interference between the waves with the same frequency can be prevented by selecting or setting a transmission data series for each antenna of each base station device so that the signal to be transmitted is encoded in each base station device using DSTBC, and different encoded series that are orthogonal to each other can be transmitted from adjacent base station devices to the overlapping area (data sequences A and B that are orthogonal to each other and are generated from the data sequence S using DSTBC) (descriptions about the contents of Reference Application 1).

Outline of the Embodiments

The structures of the system and devices according to the present invention are not necessarily limited to those shown in the above, and various structures may be used. It is also possible for the present invention to provide a method or a system for implementing the processes according to the present invention, or a program for implementing such a method or system, or a recording medium for recording the program, and in addition, the present invention can provide various types of systems and devices. The fields to which the present invention can be applied are not necessarily limited to the one shown above, and the present invention can be applied to various fields. In addition, a structure where a processor in a hardware resource with a processor and a memory, for example, runs a control program stored in a ROM (read only memory) may be used for various types of processes carried out in a system or a device according to the present invention, or the respective functional unit for carrying out these processes may be formed as independent hardware circuits. Furthermore, the present invention can be provided in a form of a recording medium that can be read by a computer, such as a floppy disk (registered trademark) or a CD-ROM (compact disc ROM), for storing the above-described control program, or the program therein, and thus, the processes according to the present invention can be carried out by inputting the control program to a computer from the recording medium so that the processor runs the control program.

INDUSTRIAL APPLICABILITY

The present invention can be used in a transmitter, a receiver, a communication system, and a communication method using the STBC method or the DSTBC method.

EXPLANATION OF SYMBOLS 1, 2, 111, 112, 201, 202 . . . base station devices
11a, 11b, 211a, 211b . . . input units
12a, 12b, 212a, 212b . . . channel codec units
13a, 13b, 31a, 31b, 213a, 213b . . . S/P converting units
14-1a, 14-1b, 14-2a, 14-2b, 32-1a, 32-1b, 32-2a, 32-2b, 214-1a, 214-1b, 214-2a, 241-2b . . . symbol mapping units
15a, 15b, 34a, 34b, 216a, 216b . . . differential encoding units
16a, 16b, 217a, 217b . . . base station ID notifying units
17a, 17b, 218a, 218b . . . STBC encoding units
18a, 18b, 219a, 219b . . . transmission units
19a, 19b, 220a, 220b . . . power amplifying units
20a, 20b, 221a, 221b . . . transmitting antennas
33a, 33b, 215a, 215b . . . initial value setting units
35a, 35b . . . initial value updating units
101 . . . central table
102 . . . central device
121 . . . mobile station device
301 . . . S/P converting unit
302, 303 . . . symbol mapping units
304 . . . differential encoding unit
305 . . . STBC encoding unit
401, 501 . . . antennas
402, 502 . . . reception units
403, 503 . . . A/D converters
404, 504 . . . quadrature conversion units
405, 505 . . . LPF
406, 506 . . . route roll-off filters
407, 507 . . . downsamplers
408, 411 . . . DSTBC decoding units
409, 509 . . . decoding determination units
412, 511, 513 . . . SW table units
413, 512, 514 . . . correlation arithmetic operation units
414, 516 . . . maximum value search units
415, 517 . . . timing detection units
416, 518 . . . timing generation units
508 . . . decoding unit (STBC decoding unit or DSTBC decoding unit)
515 . . . arithmetic operation unit

The invention claimed is:

1. A receiver for receiving a signal transmitted by a Differential Space-Time Block Coding (DSTBC) method, characterized by comprising: a receiving unit which receives a signal transmitted from the transmitting side, where a frame having a synchronous word arranged in a predetermined place is used, and the entirety of said frame including said synchronous word is encoded by the DSTBC method; an A/D converting unit which A/D converts a signal received by said receiving unit; a downsampling unit which downsamples the received signal after being A/D converted by said A/D converting unit; a first DSTBC decoding unit which decodes by the DSTBC method the signal downsampled by said downsampling unit; a second DSTBC decoding unit which decodes by the DSTBC method the received signal before being downsampled by said downsampling unit and after being A/D converted by said A/D converting unit; a synchronous word information storing unit which stores information corresponding to said synchronous word before being encoded by the DSTBC method; a correlation value acquiring unit which acquires a correlation value between the signal resulting from the decoding by said second DSTBC decoding unit and said synchronous word stored in said synchronous word information storing unit; and a sampling timing control unit which controls the sampling timing for said A/D converting unit on the basis of the correlation value acquired by said correlation value acquiring unit.

2. A receiver for receiving a signal transmitted by a Space-Time Block Coding (STBC) method or a Differential Space-Time Block Coding (DSTBC) method, characterized by comprising: a receiving unit which receives a signal transmitted from the transmitting side, where a frame having a synchronous word arranged in a predetermined place is used so as to be transmitted, and the entirety of said frame including said synchronous word is encoded by the STBC method or the DSTBC method so that the signal corresponding to said synchronous word after being encoded on the transmitting side is in a predetermined pattern; an A/D converting unit which A/D converts a signal received by said receiving unit; a decoding unit which decodes the signal after being A/D converted by said A/D converting unit by the STBC method or the DSTBC method; a synchronous word information storing unit which stores information corresponding to said synchronous word after being encoded by the STBC method or the DSTBC method; a correlation value acquiring unit which acquires a correlation value between the signal before being decoded by said decoding unit, which is the signal after being A/D converted by said A/D converting unit, and the signal of the information corresponding to said synchronous word stored in said synchronous word information storing unit; and a sampling timing control unit which controls the sampling timing for said A/D converting unit on the basis of the correlation value acquired by said correlation value acquiring unit.

3. A communication system for transmitting a signal from a transmitter to a receiver by a DSTBC (Differential Space-Time Block Coding) method, characterized in that a frame having a synchronous word arranged in a predetermined place is used, and said transmitter comprises an encoding unit which encodes the entirety of said frame including said synchronous word by the DSTBC method, and said receiver comprises a receiving unit which receives a signal transmitted from the transmitter; an A/D converting unit which A/D converts a signal received by said receiving unit; a downsampling unit which downsamples the received signal after being A/D converted by said A/D converting unit; a first DSTBC decoding unit which decodes by the DSTBC method the signal downsampled by said downsampling unit; a second DSTBC decoding unit which decodes by the DSTBC method the received signal before being downsampled by said downsampling unit and after being A/D converted by said A/D converting unit; a synchronous word information storing unit which stores information corresponding to said synchronous word before being encoded by the DSTBC method; a correlation value acquiring unit which acquires a correlation value between the signal resulting from the decoding by said second DSTBC decoding unit and said synchronous word stored in said synchronous word information storing unit; and a sampling timing control unit which controls the sampling timing for said A/D converting unit on the basis of the correlation value acquired by said correlation value acquiring unit.

* * * * *